(12) United States Patent
Shigematsu

(10) Patent No.: US 10,323,820 B2
(45) Date of Patent: Jun. 18, 2019

(54) LENS COMPONENT AND LIGHT EMITTING DEVICE

(71) Applicant: PATLITE CORPORATION, Osaka (JP)

(72) Inventor: Daisuke Shigematsu, Osaka (JP)

(73) Assignee: PATLITE CORPORATION, Osaka (JP)

( * ) Notice: Subject to any disclaimer, the term of this patent is extended or adjusted under 35 U.S.C. 154(b) by 138 days.

(21) Appl. No.: 15/505,796

(22) PCT Filed: Dec. 28, 2015

(86) PCT No.: PCT/JP2015/086480
§ 371 (c)(1),
(2) Date: Feb. 22, 2017

(87) PCT Pub. No.: WO2017/022143
PCT Pub. Date: Feb. 9, 2017

(65) Prior Publication Data
US 2017/0276319 A1 Sep. 28, 2017

(30) Foreign Application Priority Data
Aug. 5, 2015 (JP) ................................. 2015-155332

(51) Int. Cl.
*F21S 8/08* (2006.01)
*F21V 5/04* (2006.01)
(Continued)

(52) U.S. Cl.
CPC ................ *F21V 5/04* (2013.01); *F21S 8/083* (2013.01); *F21V 19/003* (2013.01); *G02B 3/00* (2013.01);
(Continued)

(58) Field of Classification Search
CPC . F21V 5/04; F21V 5/00; F21V 19/003; F21V 21/06; F21S 2/00; G02B 3/00
See application file for complete search history.

(56) References Cited

U.S. PATENT DOCUMENTS 5,642,933 A * 7/1997 Hitora .................... F21S 8/083
362/243
6,536,921 B1 3/2003 Simon
(Continued)

FOREIGN PATENT DOCUMENTS

EP 1632708 A2 3/2006
JP H03-94292 A 4/1991
(Continued)

*Primary Examiner* — Karabi Guharay
*Assistant Examiner* — Nathaniel J Lee
(74) *Attorney, Agent, or Firm* — Rabin & Berdo, P.C.

(57) ABSTRACT

A lens component disperses light from a source having a distribution characteristic in which luminosity becomes smaller according to distance from the optical axis. The component includes an incidence portion at a source position struck by light from the source and guiding portions branching from the incidence portion and extending radially from the source position. Each guiding portion includes a basal end portion joined to the incidence portion, emission end portion emitting light away from the source, and reflection surface guiding light that struck the basal end portion while performing internal reflection. The incidence portion and guiding portions form a light distribution structure arranged so that a ratio of luminosity in a direction making a predetermined angle with the optical axis with respect to luminosity in the axial direction in light emitted from the structure is larger than a corresponding ratio in the source's distribution characteristic.

23 Claims, 18 Drawing Sheets

(51) Int. Cl.
- *G02B 3/00* (2006.01)
- *F21V 19/00* (2006.01)
- *F21Y 115/10* (2016.01)
- *F21V 23/06* (2006.01)
- *F21W 111/00* (2006.01)

(52) U.S. Cl.
CPC .......... *F21V 23/06* (2013.01); *F21W 2111/00* (2013.01); *F21Y 2115/10* (2016.08)

(56) References Cited

U.S. PATENT DOCUMENTS

| | | | |
|---|---|---|---|
| 2006/0044814 A1* | 3/2006 | Ikeda | F21S 8/083 362/382 |
| 2012/0147621 A1 | 6/2012 | Holten et al. | |
| 2013/0114268 A1 | 5/2013 | Shigematsu et al. | |

FOREIGN PATENT DOCUMENTS

| | | |
|---|---|---|
| JP | 4089692 B2 | 5/2008 |
| JP | 2013-502685 A | 1/2013 |
| JP | 2014-225480 A | 12/2014 |
| WO | WO 2011-021135 A1 | 2/2011 |
| WO | WO 2015-049750 A1 | 4/2015 |

\* cited by examiner

EMISSION ANGLE

EMISSION ANGLE

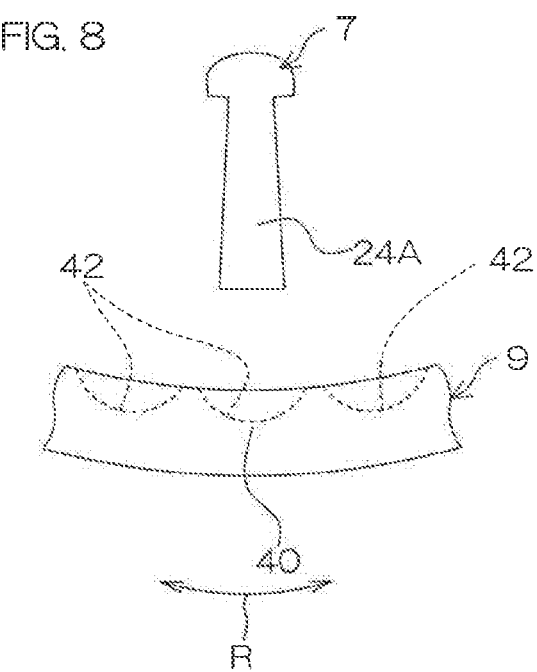

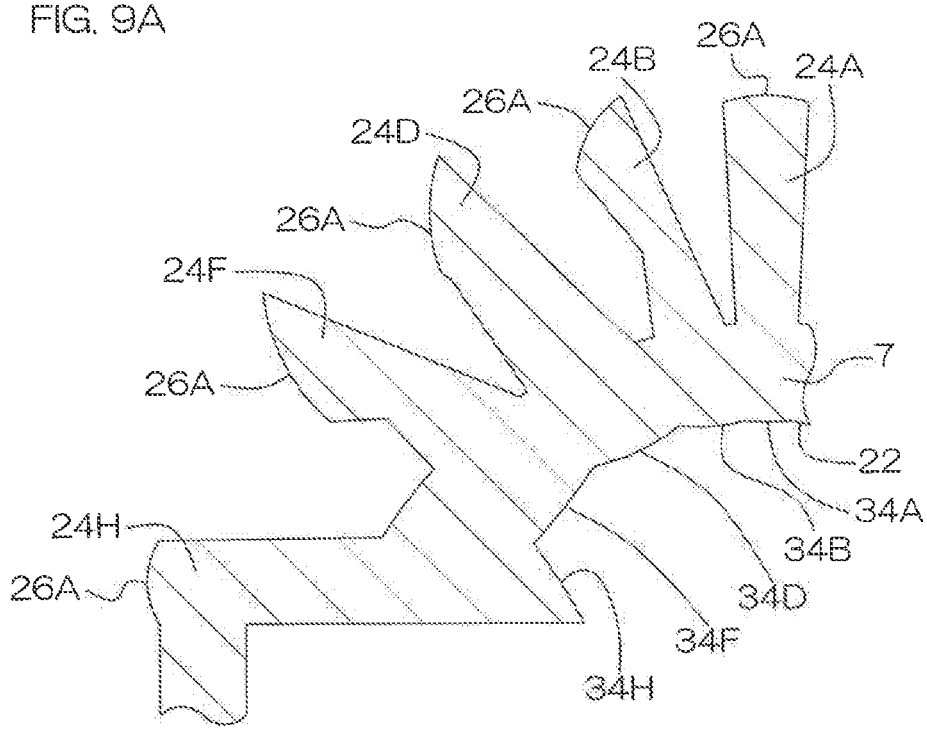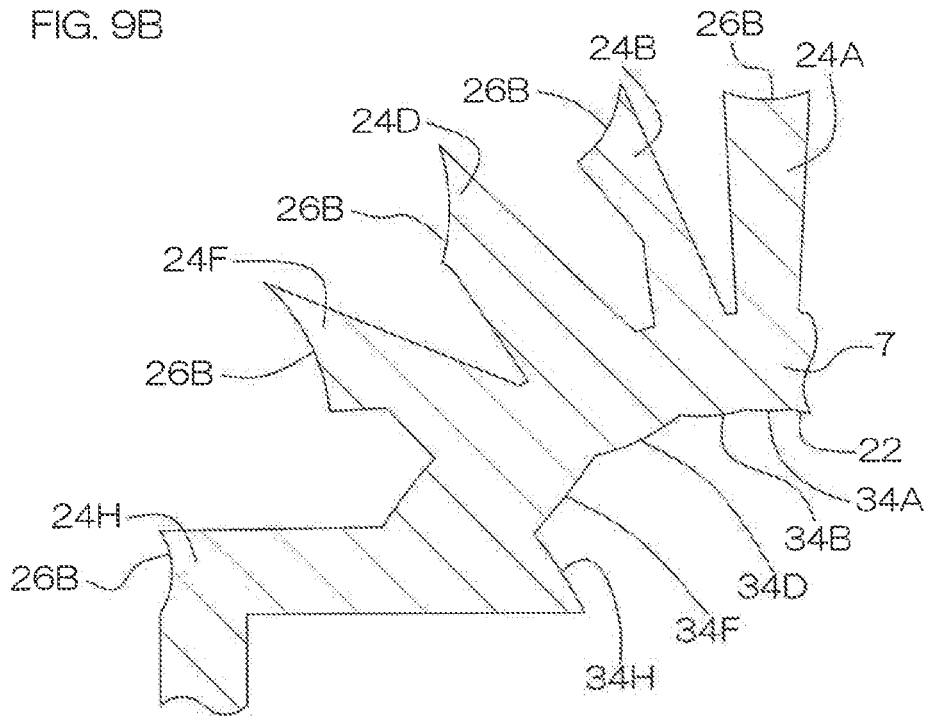

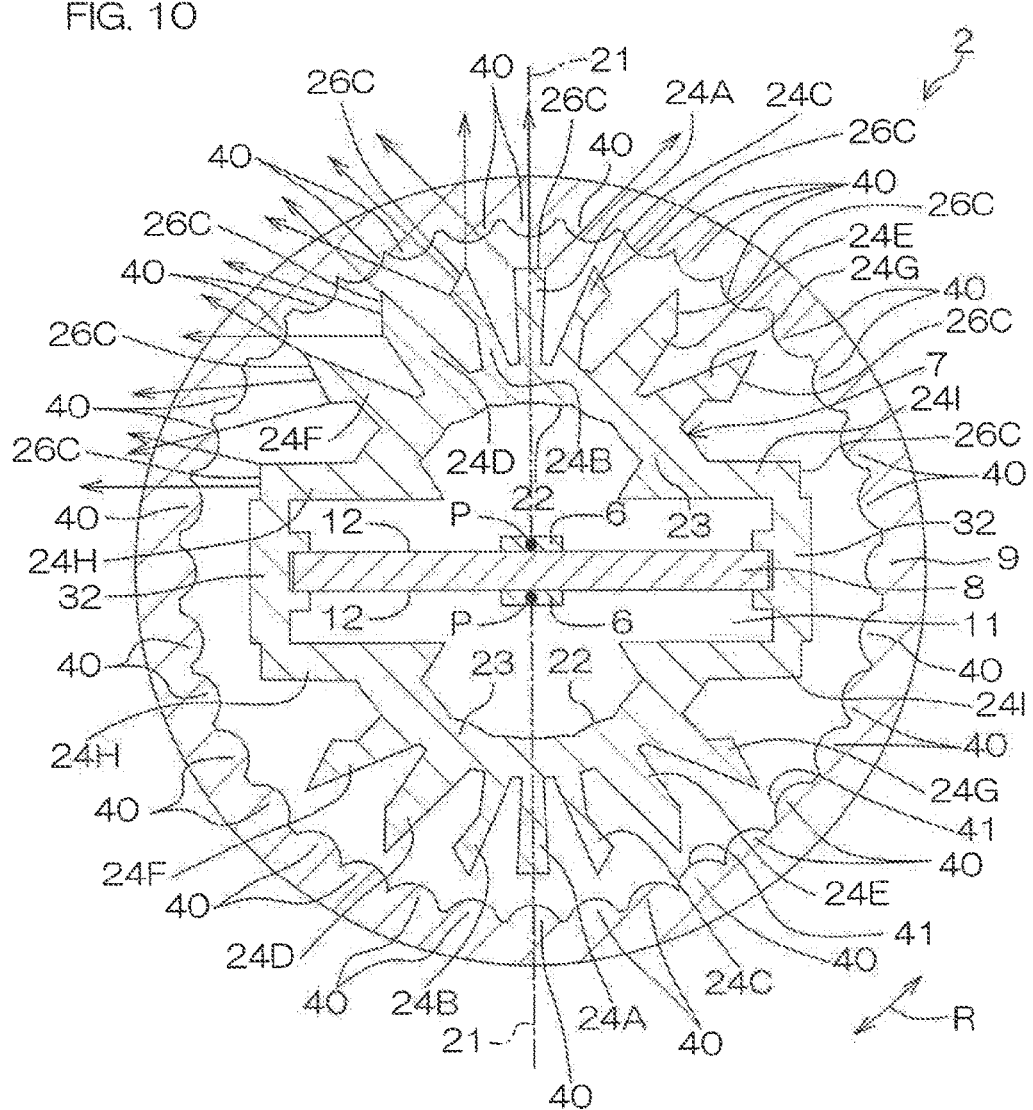

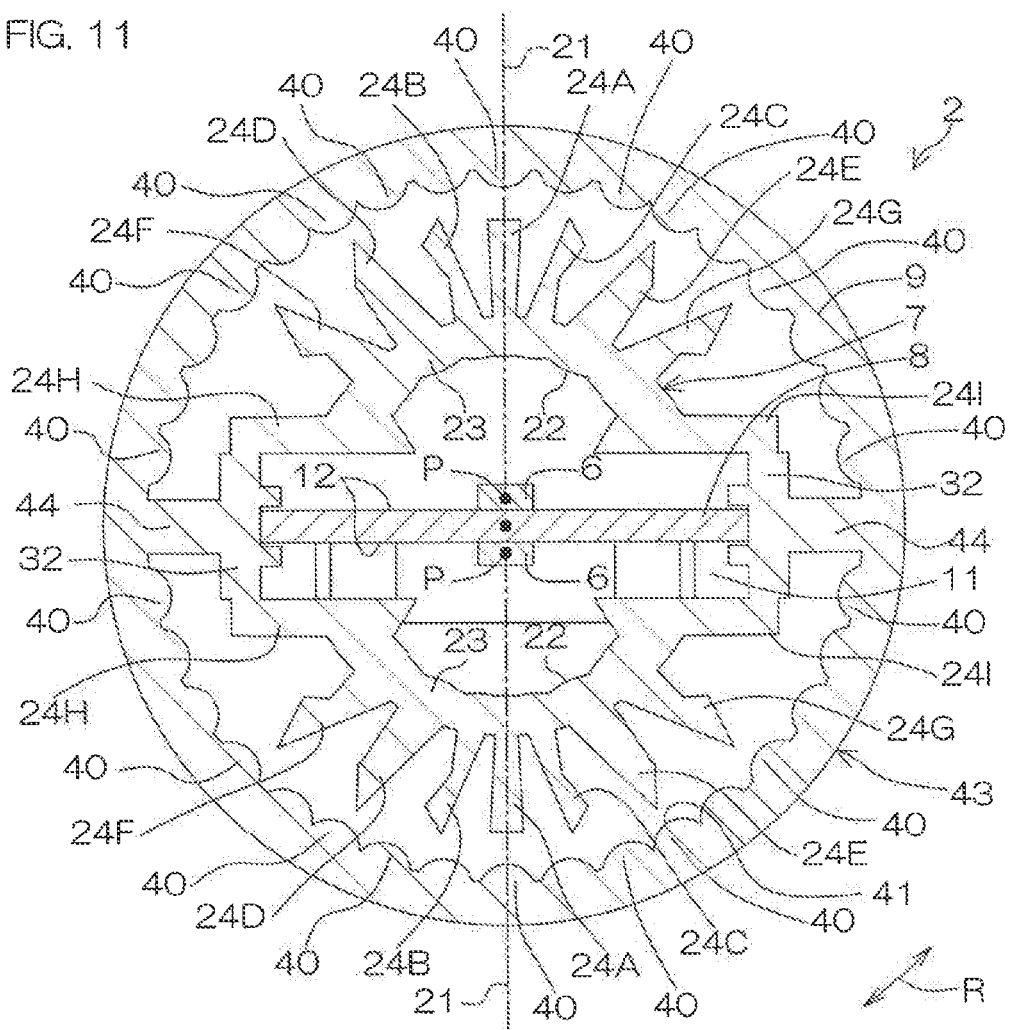

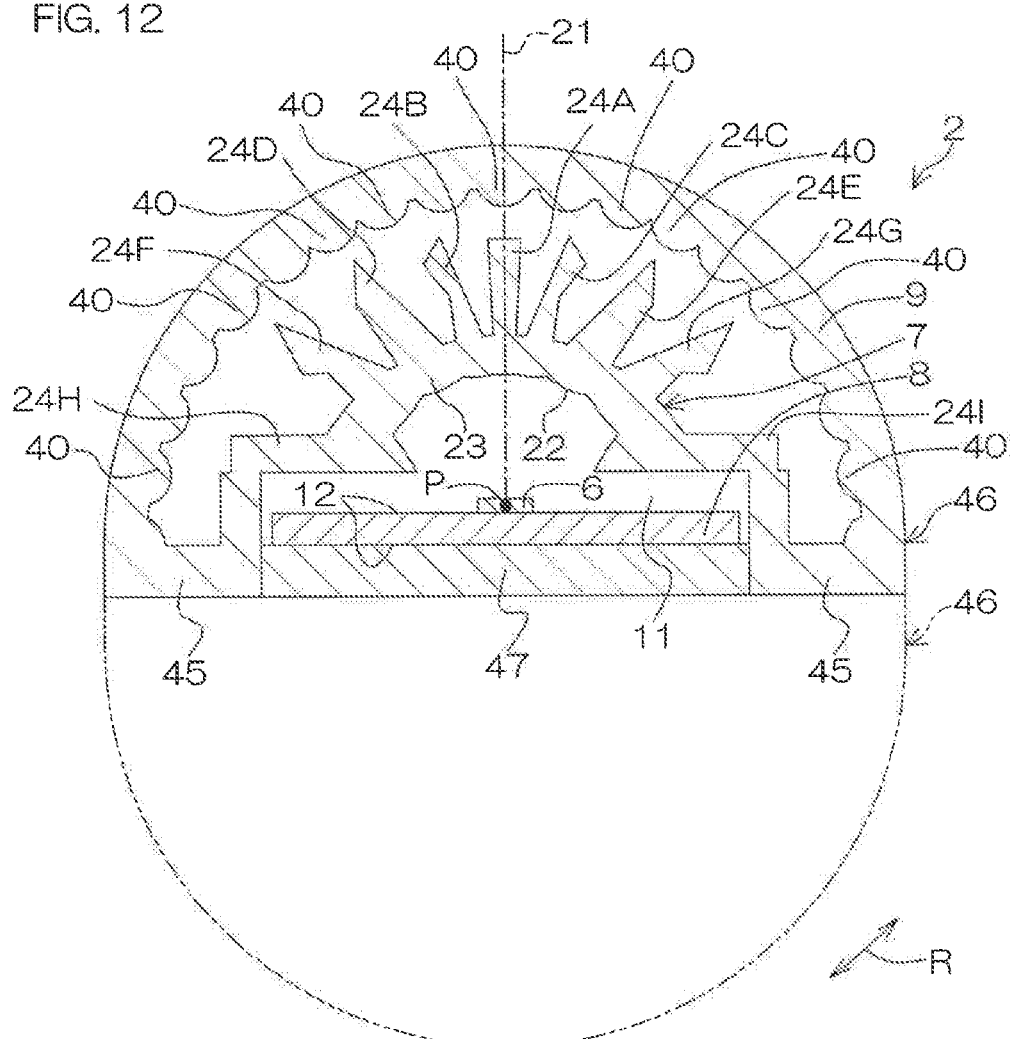

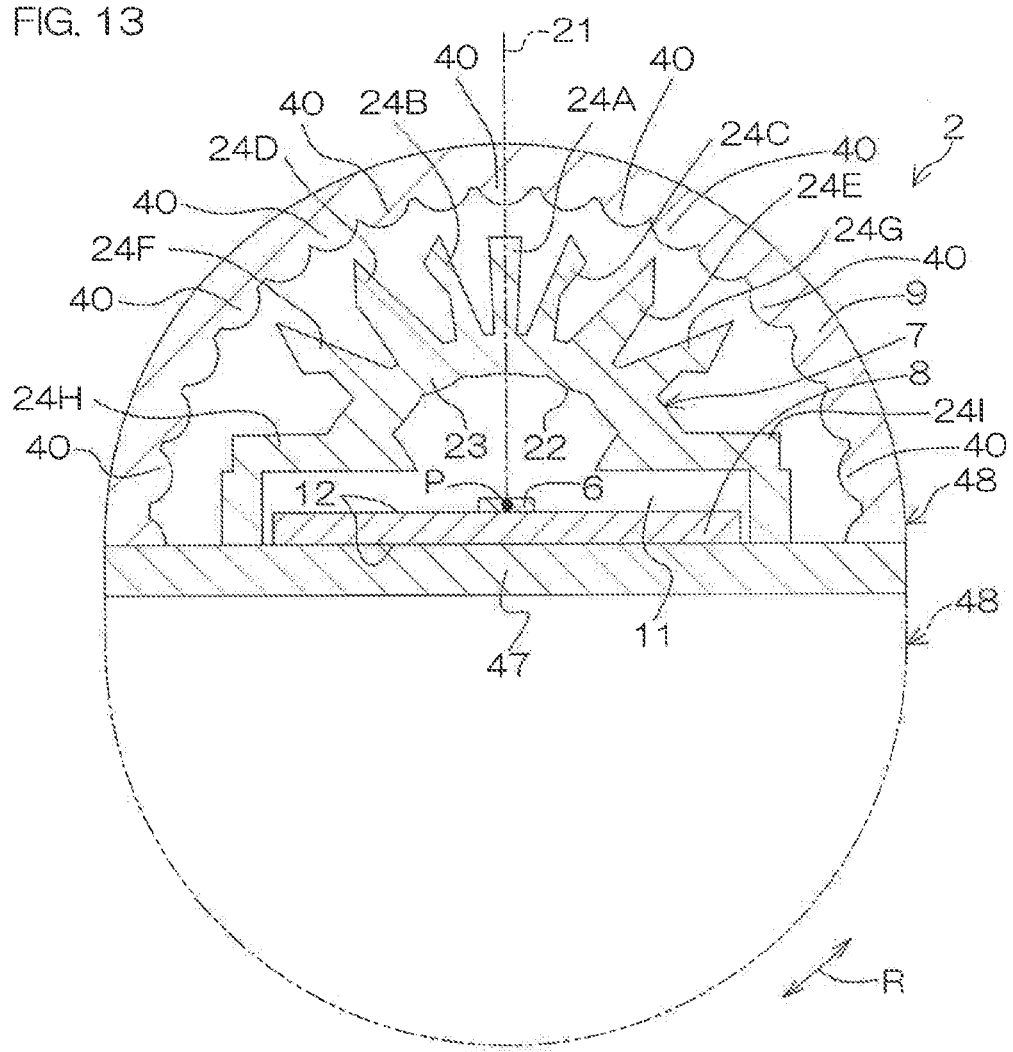

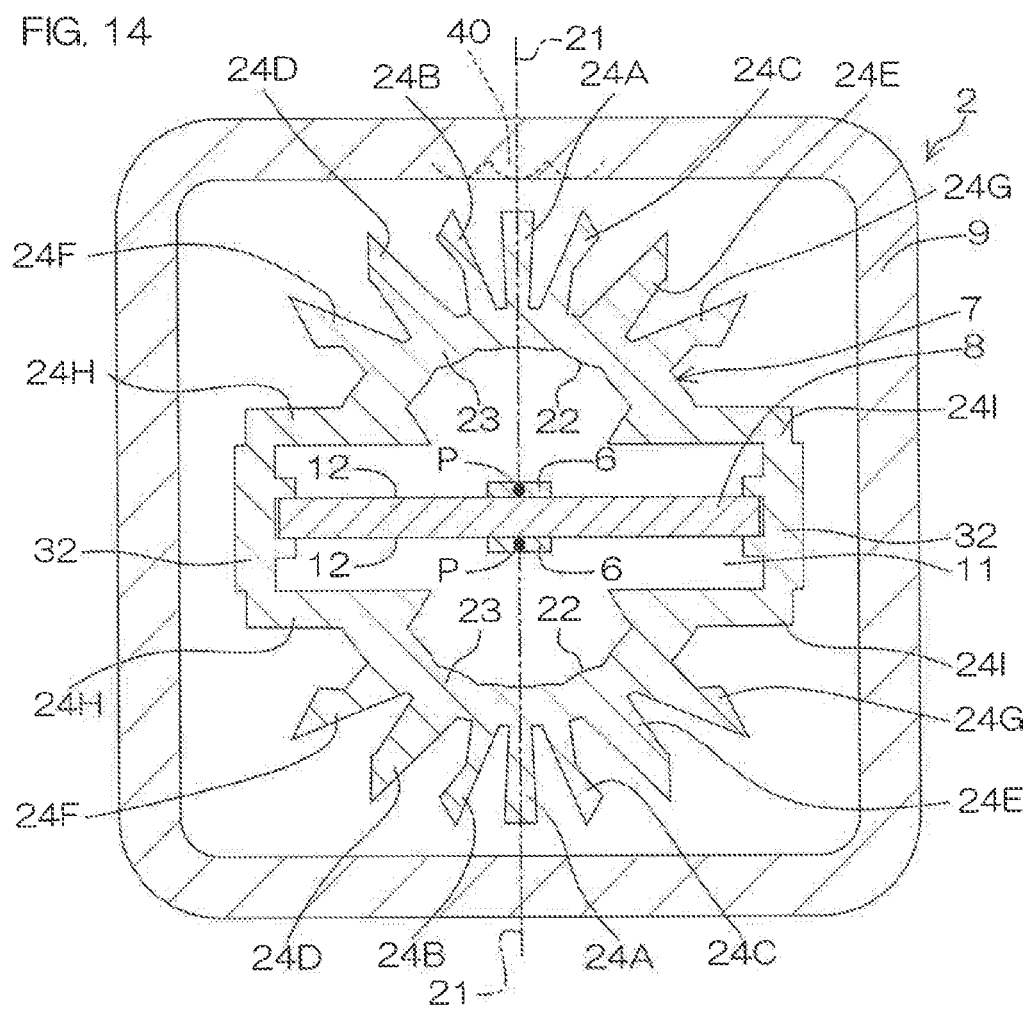

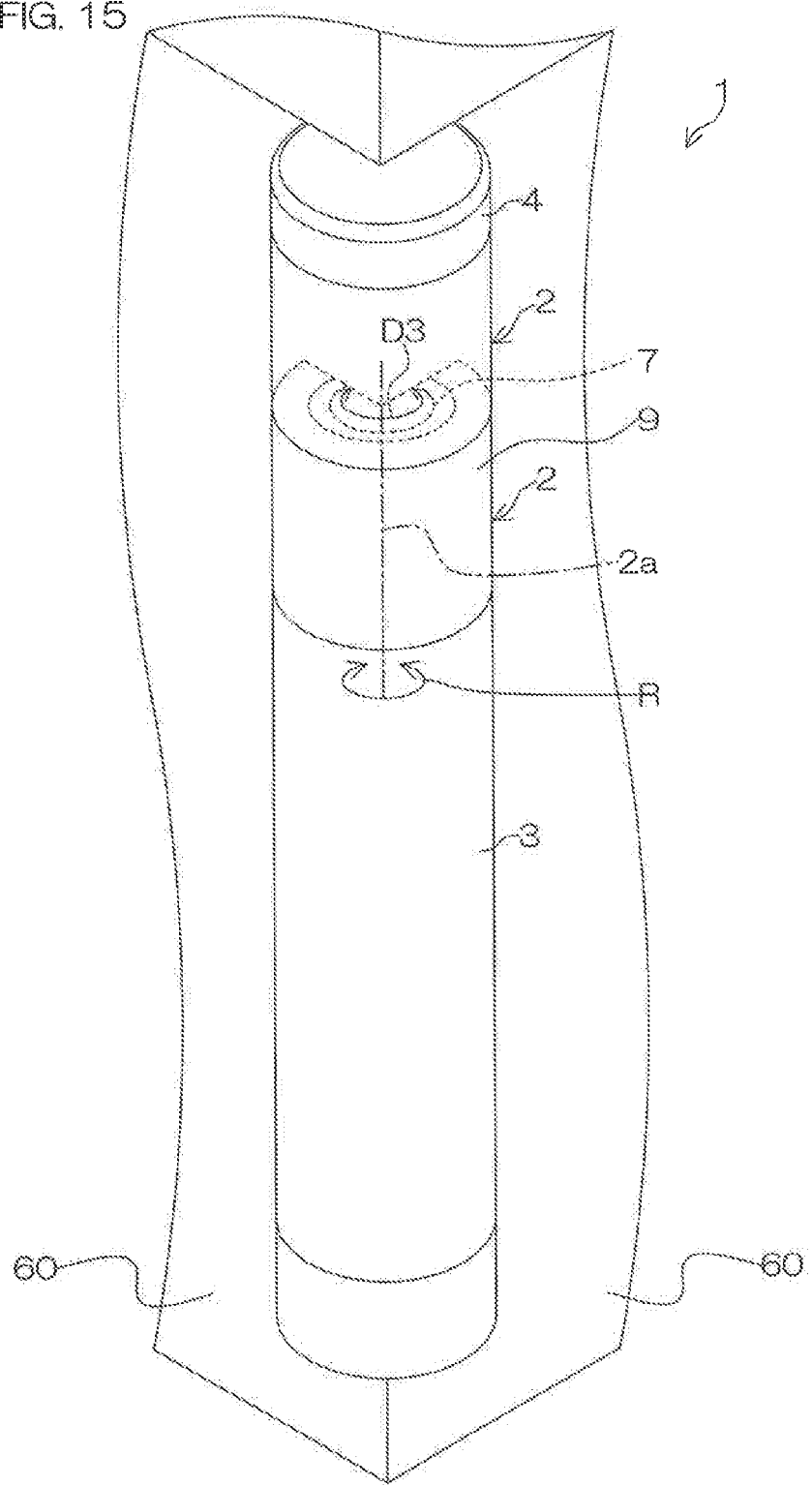

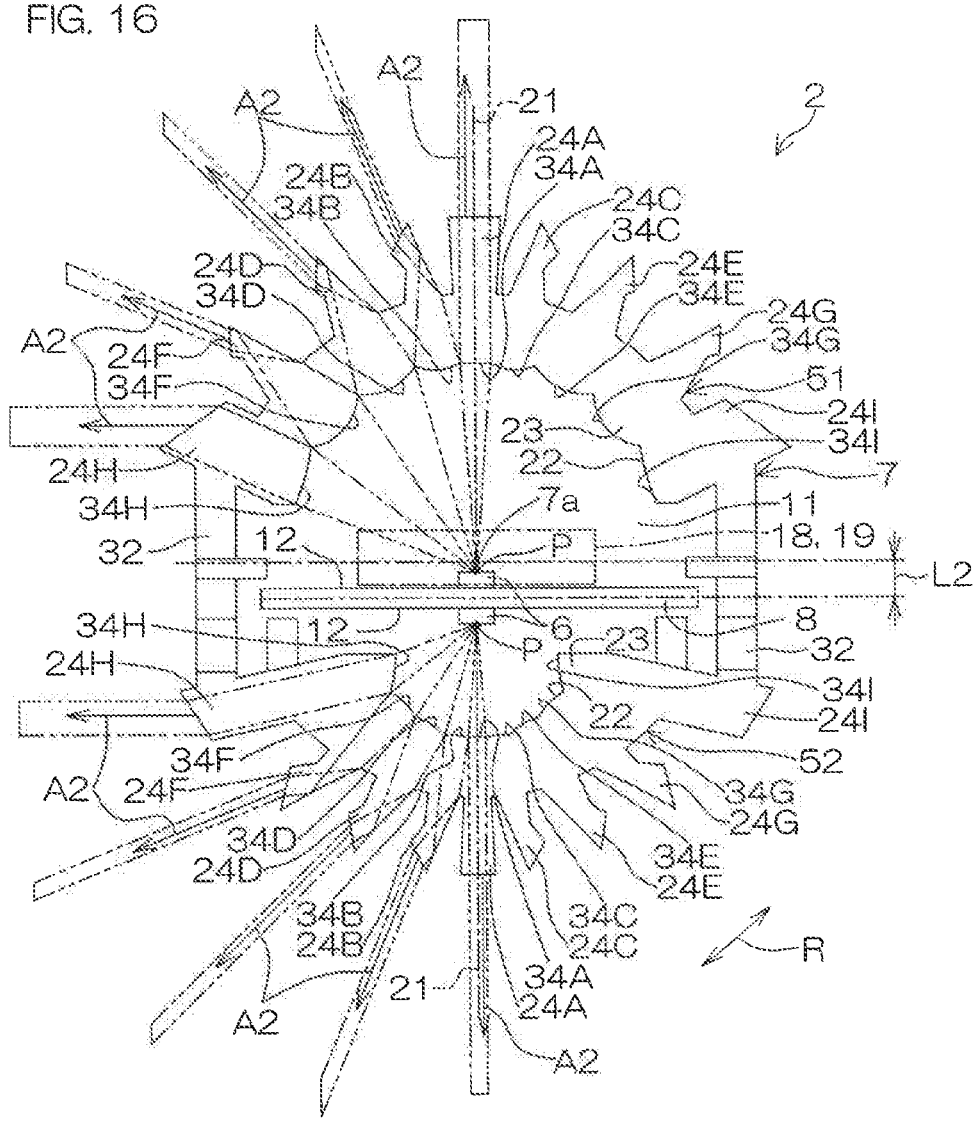

LENS COMPONENT AND LIGHT EMITTING DEVICE

TECHNICAL FIELD

The present invention relates to a lens component and a light emitting device that uses the lens component.

BACKGROUND ART

Mechanical equipment or the like that is used in a factory has been provided with a signal display lamp. The signal display lamp is a light emitting device that emits a light emission signal to impart a state of the mechanical equipment or the like to its surroundings. The signal display lamp has, for example, a light source and a lens component that guides light from the light source to its surroundings (see Patent Literatures 1 and 2, for example).

The lens component of the signal display lamp of Patent Literature 1 assumes a substantially cylindrical external shape, and has many plate-shaped light guides that are radially disposed. A substrate is attached to an end in the axial direction of the lens component, and a light emitting diode (LED) serving as a light source is mounted on the substrate. Light of the LED is emitted to its surroundings through the lens component.

The lens component of the signal display lamp of Patent Literature 2 assumes a substantially circular-tube shape. A substrate is longitudinally disposed at a central hole of the lens component, and LEDs serving as light sources are mounted on both sides of the substrate.

PRIOR ART DOCUMENTS

Patent Literature

[Patent Literature 1] Japanese Patent No. 4089692
[Patent Literature 2] Japanese Patent Application Publication No. 2014-225480

SUMMARY OF THE INVENTION

Problems to be Solved by the Invention

In the signal display lamp of Patent Literature 1, an electroconductive member for an electric power supply and the like to the substrate is disposed around the lens component. This electroconductive member is an exclusive part that is specially designed and produced for the signal display lamp, and therefore production costs are high.

In the signal display lamp of Patent Literature 2, an LED generally has a directivity, and is mounted on the substrate placed in a longitudinal manner. Therefore, irregularity is liable to occur in visibility when viewed from its surroundings.

These problems are not limited to the signal display lamp, and are common in light emitting devices each of which emits light to the surroundings.

Therefore, it is an object of the present invention to provide a light emitting device that is capable of improving visibility from its surroundings with a low-cost arrangement and to provide a lens component that is used in the light emitting device.

Solution to the Problems

The present invention provides a lens component that disperses light from a light source having a light distribution characteristic in which luminosity becomes smaller according to a distance from an optical axis. This lens component includes a light incidence portion that has an incidence surface that light from the light source placed at a predetermined light-source position enters and a plurality of light guiding portions that branch from the light incidence portion and that extend radially with respect to the light-source position. Each of the light guiding portions includes a basal end portion joined to the light incidence portion, an emission end portion that emits light outwardly away from the light source, and a light-guide reflection surface that guides light that has stricken the basal end portion from the light incidence portion to the emission end portion while performing internal reflection. The light incidence portion and the plurality of light guiding portions forma light distribution structure. This light distribution structure is arranged so that a ratio of luminosity in a predetermined direction making a predetermined angle with the optical axis with respect to luminosity in a direction along the optical axis in light emitted from the light distribution structure is larger than a corresponding ratio in the light distribution characteristic of the light source.

This lens component can be used by placing a light source, such as a light emitting diode (LED), at the light-source position. Even if the light source has a light distribution characteristic in which luminosity becomes smaller according to a distance from the optical axis, light that has penetrated the lens component can have a light distribution characteristic in which luminosity of light in the direction away from the optical axis is restrained from being decreased. In other words, it is possible to secure large luminosity even in the direction away from the optical axis because the light distribution characteristic of the light source is corrected by the lens component. Therefore, it is possible to improve the visibility of a light emitting device that uses the lens component. Moreover, it is possible to heighten the visibility regardless of the light distribution characteristic of the light source, and therefore it is possible to improve the degree of freedom of the disposition of the light source, and hence is possible to reduce production costs of the light emitting device that uses the lens component. In more detail, it is possible to determine the disposition of the light source so that a general-purpose product is usable for an electric connection, and therefore it is possible to reduce production costs.

Additionally, in one preferred embodiment of the present invention, the plurality of light guiding portions include a first light guiding portion and a second light guiding portion that is disposed farther from the optical axis than the first light guiding portion and that is stricken by light having a quantity of light equal to a quantity of incident light onto the first light guiding portion from the light source. In this case, it is possible to make the quantities of light penetrating the first and second light guiding portions placed at mutually different positions equal to each other, and hence is possible to further improve the visibility.

In this arrangement, the first light guiding portion and the second light guiding portion may each have a pair of light-guide reflection surfaces, and the second light guiding portion may be larger than the first light guiding portion in an interval between the pair of light-guide reflection surfaces. This arrangement makes it possible to easily make the quantities of incident light onto the first and second light guiding portions equal to each other.

Additionally, in one preferred embodiment of the present invention, the incidence surface includes a plurality of incidence regions that are disposed so as to face the basal end portions of the plurality of light guiding portions, respectively, and that gather or condense light from the light source or convert light from the light source into parallel light and then let the light to enters a corresponding one of the light guiding portions. In this case, light from the light source passes through a corresponding one of the incidence regions for each part corresponding to a direction in which light is emitted from the light source, and is guided to a corresponding one of the light guiding portions while restraining the subsequent spread. This makes it possible to allow light that has stricken each incidence region to reliably enter a corresponding light guiding portion. In other words, this makes it possible to reliably distribute light to the plurality of light guiding portions. Additionally, light is gathered or converted into parallel light by means of the incidence regions toward a corresponding light guiding portion, and therefore it is possible to reliably guide light that has stricken the incidence regions to the light guiding portions without enlarging the basal end portion of the light guiding portion. Therefore, it is possible to restrain the basal end portion of the light guiding portion from being enlarged, and hence is possible to heighten the degree of freedom of the design of the light guiding portion and of the design of the lens component, and therefore it is possible to contribute to the improvement of visibility and to the reduction of production costs.

In this arrangement, the plurality of incidence regions may include a first incidence region and a second incidence region that is disposed farther from the optical axis than the first incidence region and that is wider than the first incidence region. Because of the light distribution characteristic of the light source, the quantity of light for each unit area becomes smaller in the second incidence region than in the first incidence region. Therefore, the quantity of incident light onto the second incidence region is increased by widening the second incidence region. As a result, it is possible to increase the quantity of light penetrating a corresponding second light guiding portion. Therefore, it is possible to further improve visibility.

In more detail, in a plane that includes the optical axis and that traverses the plurality of light guiding portions, an angular range of the second incidence region faced from the light-source position may be made wider than an angular range of the first incidence region faced from the light-source position. This arrangement facilitates a design to make the second incidence region wider than the first incidence region. As a result, it is possible to contribute to the improvement of visibility and to the reduction of production costs.

Additionally, in one preferred embodiment of the present invention, the plurality of light guiding portions include at least one light guiding portion in which an angle that light emitted from the emission end portion makes with the optical axis is larger than an angle that the light makes with the optical axis when the light enters the light incidence portion. In this case, the direction of light changes to recede from the optical axis before and after passing through the light guiding portion. Therefore, it is possible to efficiently guide light in a direction making a large angle with the optical axis, and therefore this is desirable for realizing a light distribution structure.

Additionally, in one preferred embodiment of the present invention, the emission end portions of the plurality of light guiding portions are disposed in the plurality of emission regions, respectively, that are set to be away from each other so as to evenly divide a predetermined angular range with respect to a circumferential direction that centers on the light-source position and that is along a plane including the optical axis. In this case, it is possible to restrain irregularity in visibility with respect to the circumferential direction of the lens component so as to be small and hence is possible to further raise visibility.

Additionally, in one preferred embodiment of the present invention, the emission end portions of the plurality of light guiding portions emit light at mutually equal quantities of light. In this case, it is possible to restrain irregularity in visibility with respect to the circumferential direction of the lens component so as to be small and hence is possible to further raise visibility.

Additionally, in one preferred embodiment of the present invention, the emission end portions of the plurality of light guiding portions emit light in a plurality of emission directions, respectively, that evenly divide a predetermined angular range with respect to a circumferential direction that centers on the light-source position and that is along a plane including the optical axis. In this case, it is possible to restrain irregularity in visibility with respect to the circumferential direction of the lens component so as to be small and hence is possible to further raise visibility.

Additionally, in one preferred embodiment of the present invention, the plurality of light guiding portions have a plate shape that extends in parallel with a straight line that is perpendicular to the optical axis and that passes through the light-source position, and the emission end portion has a convex curved part that protrudes in a direction receding from the light-source position. In this case, when viewed in a cross section including a straight line that is perpendicular to the optical axis and that passes through the light-source position, the emission end portion forms a convex curved line protruding outwardly, and hence has a light gathering function. As a result, even if the direction of light emitted from the light source spreads radially in the cross section, its spread is restrained by passing through the light guiding portion. As a result, it is possible to emit light in a specific direction, and hence is possible to contribute to the improvement of visibility.

Additionally, in one preferred embodiment of the present invention, the emission end portion emits parallel light in a plane that includes the optical axis and that traverses the plurality of light guiding portions. In this case, it is possible to fix the direction of light emitted from the emission end portion. For example, when an optical component that has an optical diffusing function is disposed outside the lens component, it is possible to fix the direction of light that enters the optical component from each light guiding portion, and therefore it becomes easy to design the optical component.

Additionally, in one preferred embodiment of the present invention, the emission end portion emits nonparallel light in a plane that includes the optical axis and that traverses the plurality of light guiding portions. In this case, it is possible to diffuse light emitted from the emission end portion, and therefore it is possible to further improve visibility when viewed from the surroundings.

Additionally, the present invention provides a light emitting device that includes the lens component and a light source placed at the light-source position of the lens component. In the light emitting device, it is possible to obtain the functions and advantages that have been described in relation to the lens component.

The light emitting device may further include a translucent cover that is disposed outside the lens component and that has a diffusing portion that diffuses light striking from the lens component. This arrangement allows light emitted from the lens component to penetrate the cover and to be emitted to the surroundings while diffusing. Therefore, it is possible to restrain irregularity in visibility so as to be small when the light emitting device is viewed from the surroundings.

Additionally, in this arrangement, the light incidence portion, the plurality of light guiding portions, and the diffusing portion may form a light distribution structure, and this light distribution structure may be formed so that a ratio of luminosity in a predetermined direction making a predetermined angle with the optical axis with respect to luminosity in the direction along the optical axis in light emitted from the light distribution structure is larger than a corresponding ratio in the light distribution characteristic of the light source. According to this arrangement, in spite of the fact that the light source has a light distribution characteristic in which luminosity becomes smaller according to a distance from the optical axis, the luminosity of light in a direction away from the optical axis is restrained from being reduced concerning light that penetrates the lens component and the cover in comparison with that light distribution characteristic. Additionally, as mentioned above, the degree of freedom of the disposition of the light source is heightened, and therefore it is possible to determine the disposition of the light source so that a general-purpose product is usable for an electric connection, and, accordingly, it is possible to reduce production costs. Therefore, it is possible to improve the visibility of the light emitting device, and it becomes possible to reduce production costs of the light emitting device.

Additionally, in this arrangement, the diffusing portion may include a plurality of diffusing lens portions stricken by light emitted from the emission end portions of the plurality of light guiding portions, respectively. This arrangement makes it possible to adjust a diffusion status or visual perception from the surroundings by adjusting a design variable of the diffusing lens portion. Therefore, it is possible to further improve visibility.

In this arrangement, the diffusing lens portion may include a convex lens surface convexed toward a corresponding one of the emission end portions or a concave lens surface concaved with respect to a corresponding one of the emission end portions. This arrangement makes it possible to diffuse light with a simple arrangement.

In this arrangement, each of the emission end portions may correspond to one of the diffusing lens portions. According to this arrangement, the emission end portion and the diffusing lens portion are provided so as to have a one-to-one correspondence, and therefore it is easy to design a light emitting device to improve visibility.

Additionally, in the aforementioned arrangement, each of the emission end portions may correspond to consecutively placed ones of the plurality of diffusing lens portions. This arrangement makes it possible to widely diffuse light from the single emission end portion through the plurality of diffusing lens portions of the cover. As a result, it is possible to further improve visibility.

Additionally, in one preferred embodiment of the present invention, the light source includes a pair of light sources that share the optical axis and that emit light in mutually opposite directions. In this case, it is possible to improve visibility from the entire circumference.

Additionally, in one preferred embodiment of the present invention, the light emitting device further includes a substrate having a pair of principal surfaces on which the pair of light sources are mounted, respectively. In this case, preferably, the lens component has the pair of light-source positions corresponding to the pair of light sources, and has a tubular external shape extending in parallel with a straight line that is perpendicular to the optical axis and that passes through the light-source position, and has a light-source containing portion that contains the pair of light-sources so as to place the pair of light-sources at the pair of light-source positions, respectively, through the substrate. Additionally, preferably, the plurality of light guiding portions are disposed such that each group consisting of ones of the plurality of light guiding portions surrounds each light source. In this case, it is possible to realize the light emitting device with a practicable structure. For example, it is also possible to longitudinally dispose the substrate along the axis of the tubular shape, and therefore it is easy to simplify the structure to supply electric power to the substrate.

In this arrangement, the lens component may include divided pieces obtained by dividing the tubular external shape into a plurality of pieces in a circumferential direction, and may form a tubular external shape by joining the divided pieces together in the circumferential direction. According to this arrangement, the divided pieces of the lens component become simpler in shape than in a case in which the lens component is not divided, and therefore it is possible to easily produce the device. For example, a pair of lens components each of which forms the region of approximately a half of a circle (about 180 degrees) around a light source in a transverse section of a light emitting device may be combined together, and, as a result, it is possible to form a lens component that surrounds almost the whole circumference (about 360 degrees) around the light source. Additionally, it is possible to form a lens component that is capable of meeting various angular ranges by use of a few kinds of basic lens components.

Additionally, in one preferred embodiment of the present invention, the lens component has an external shape in which a tubular shape extending along a central axis parallel to a straight line that is perpendicular to the optical axis and that passes through the light-source position is partially cut off in the circumferential direction, and the external shape has a central angle that exceeds 180 degrees around the central axis. In this case, it is possible to realize high visibility from the surroundings having a wide range exceeding 180 degrees exclusive of the cut-off part. A cut-off space may be used to attach the light emitting device.

Additionally, in one preferred embodiment of the present invention, the plurality of lens components are connectable together along the axis of the tubular shape, and the plurality of substrates are disposed at the light-source containing portions of the plurality of lens components, respectively, and the light emitting device further includes a connector by which the substrates disposed at the light-source containing portions, respectively, of the lens components contiguous to each other are electrically connected to each other. In this case, the plurality of lens components can be used by connecting these together. At this time, it is possible to electrically connect the substrates together by means of the connectors with ease. In more detail, lens components are connected together along the axis of the tubular shape, and therefore it is possible to make the end edges of the substrates respectively provided in the pair of lens components to be connected together to face each other. Therefore, a pair of connectors that are fittable to each other are disposed at end edges facing each other of a pair of substrates, and, as a result, it is possible to electrically connect the pair of substrates together. A general-purpose product can be used as the connector used to connect substrates together, and therefore it is possible to reduce production costs of the light emitting device.

In one preferred embodiment of the present invention, the substrate is disposed such that the pair of principal surfaces follow a direction in which the axis of the tubular shape of the lens component extends while being offset from the axis, and the connector is mounted on a first principal surface that is one of the pair of principal surfaces and that is on a side closer to the axis. According to this, a distance to the incidence surface from the light source mounted on the first principal surface is longer than a distance to the incidence surface from the light source mounted on a second principal surface that is one of the pair of principal surfaces and that is on a side farther from the axis. Therefore, it is possible to secure a larger space on the first principal surface side of the substrate than on the second principal surface side, and it is possible to dispose the connector in this large space. Therefore, limitations on the size of the connector are reduced, and therefore the degree of freedom of the selection of connectors is heightened, and therefore it becomes easy to employ a general-purpose connector. As a result, it is possible to further reduce costs.

In the present description, the expression "equal" includes both meanings, i.e., being exactly equal and being almost equal. The same applies to the expression "even." Herein, "being equal" includes a case in which there is a difference within the range of an error in manufacturing or of a tolerance, and this case is usually regarded as being equal. "Being almost equal" includes a case in which values differ from each other within the range of an allowable error in addition to the "being equal" case. In the "being almost equal" case, it is considered that a not-so-different effect can be obtained if a value is in the range of an allowable error. The allowable-error range may be any one of ±3%, ±5%, and ±10%, and depends on the design of the light emitting device. For example, the requirement of an error in the direction of light emitted from the emission end portion of the lens component becomes severer in proportion to an increase in distance between the emission end portion of the lens component and the diffusing portion of the cover.

BRIEF DESCRIPTION OF THE DRAWINGS

FIG. 8 is an enlarged cross-sectional view of a main part of the display unit, showing a modification of a cover.

FIG. 9A and FIG. 9B are each a transverse sectional view of a main part of the lens component, showing a modification of a light emission end of the lens component, in which a light guiding portion is shown in an enlarged view.

FIG. 10 is a transverse sectional view of a main part of the display unit, showing a modification of a correspondence relationship between the light emission end of the light guiding portion of the lens component and the cover.

FIG. 11 is a transverse sectional view of the display unit, showing a modification in which the lens component and the cover of the display unit are integrated with each other.

FIG. 12 is a transverse sectional view of the display unit, showing a modification when the lens component of the display unit has a semicircular shape in cross section.

FIG. 13 is a transverse sectional view of the display unit, showing another modification when the lens component of the display unit has a semicircular shape in cross section.

FIG. 14 is a transverse sectional view showing another modification of the display unit.

FIG. 15 is a perspective view of a stacked signal lamp that includes a display unit having a partially cut-off shape.

FIG. 16 is a transverse sectional view of still another modification of the lens component.

PREFERRED EMBODIMENTS OF THE INVENTION

Preferred embodiments of the present invention will be hereinafter described in detail with reference to the accompanying drawings. In the preferred embodiments, a description is provided concerning a stacked signal lamp serving as a light emitting device and a lens component that is used in the stacked signal lamp, and the lens component is widely applicable to various types of light emitting devices including a warning lamp. A stacked signal lamp, an indicator lamp, a diffused-light-type warning light, a revolving light, etc., can be mentioned as examples of the warning lamp.

Figure 1:
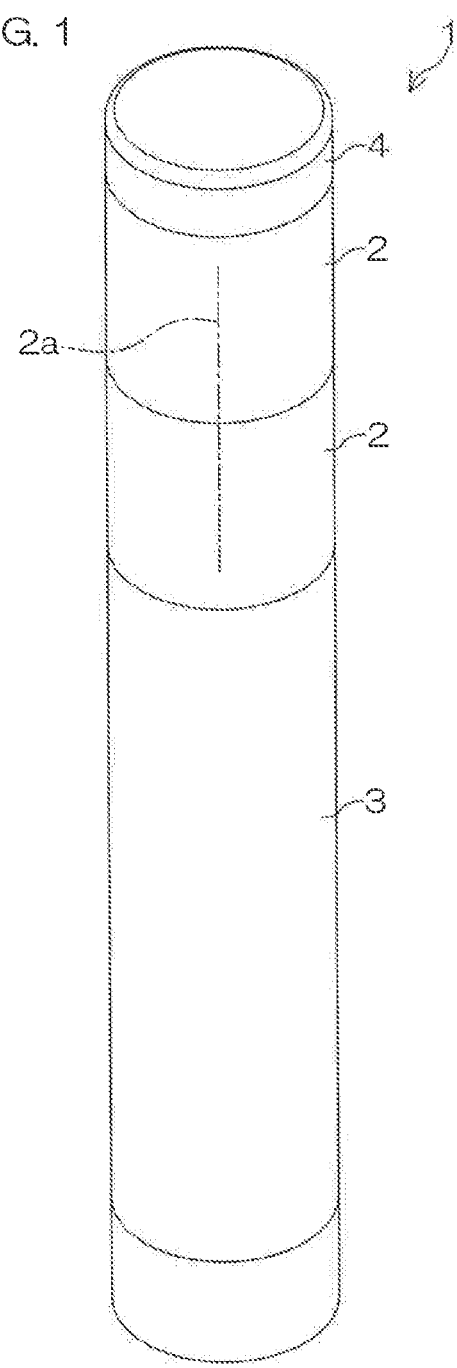
FIG. 1 is a perspective view of a schematic arrangement of a stacked signal lamp of a preferred embodiment of the present invention.
Figure 2:
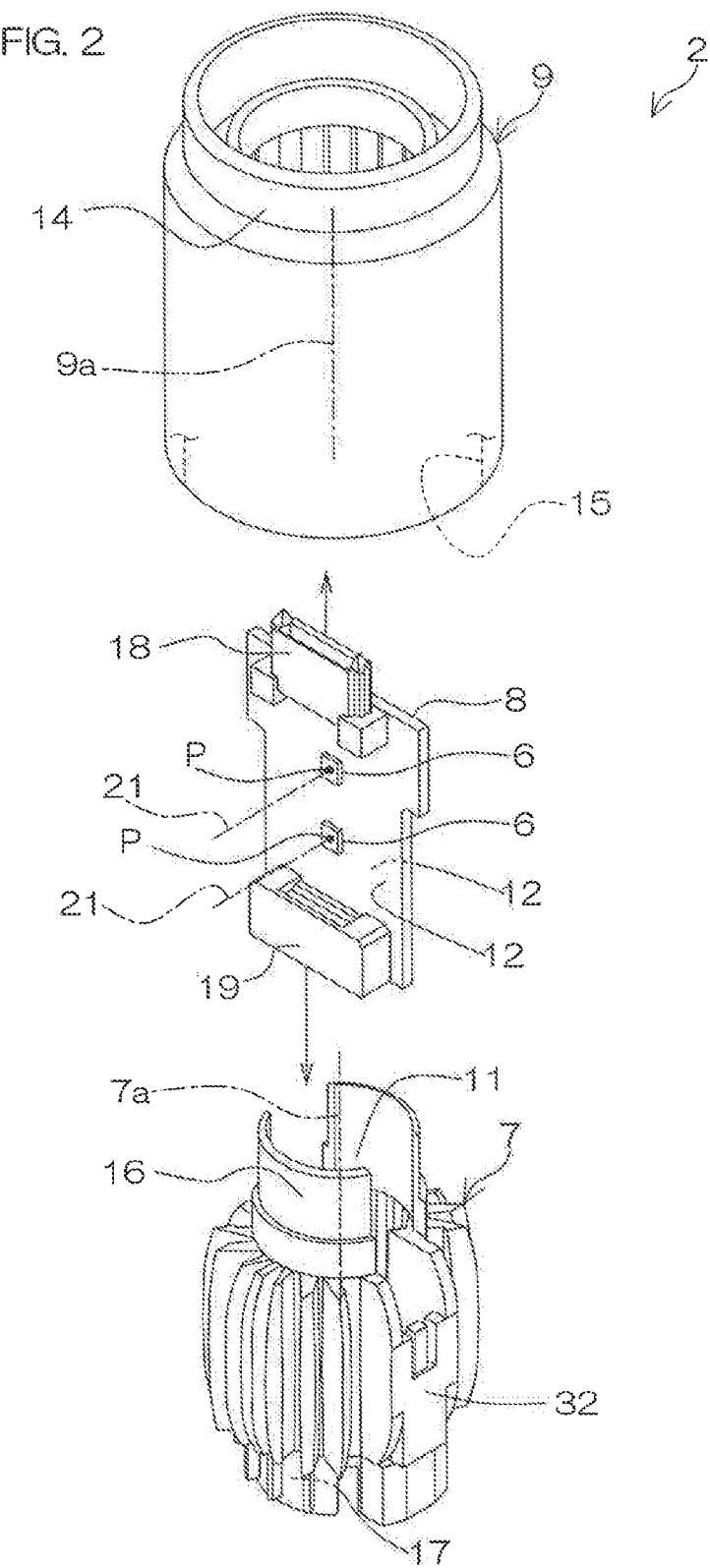
FIG. 2 is an exploded perspective view of a display unit included in the stacked signal lamp.
Figure 3:
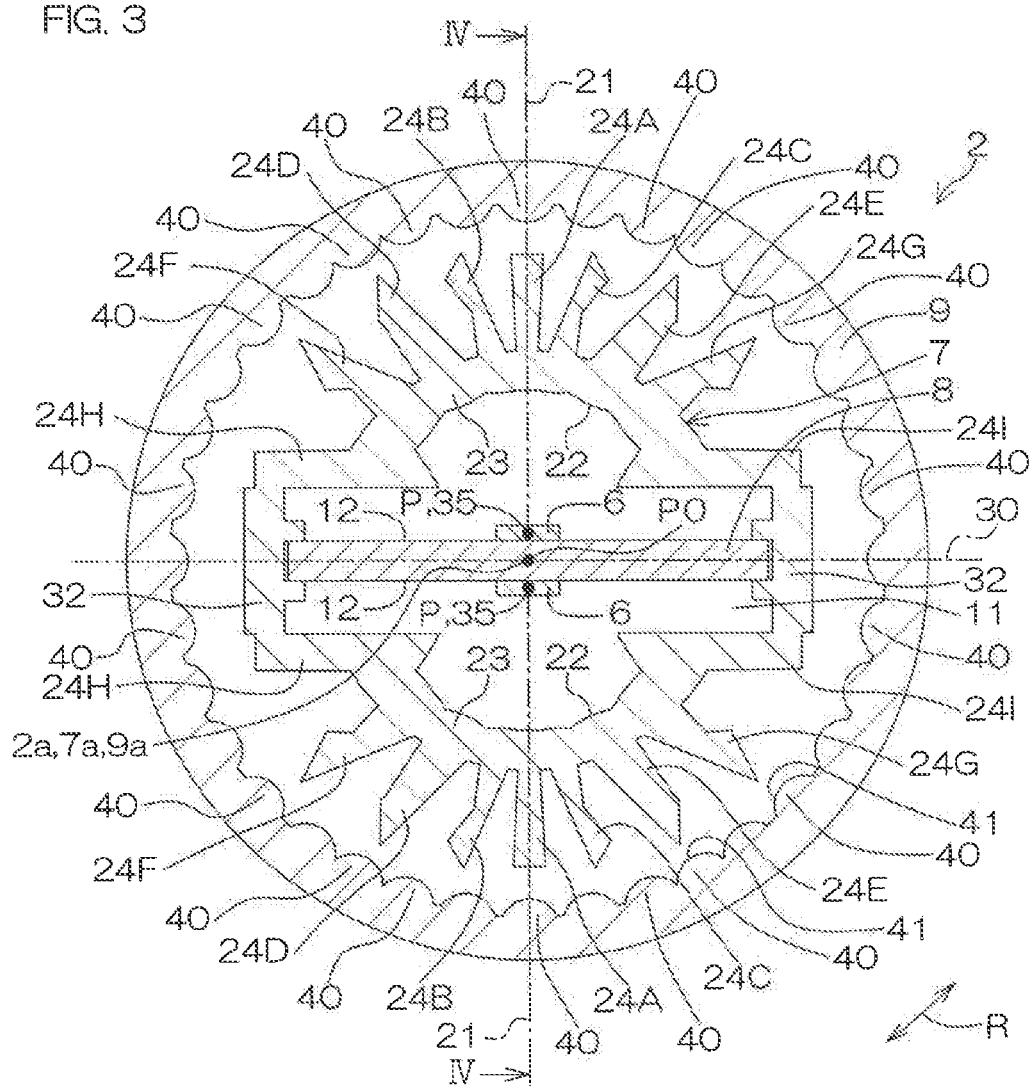
FIG. 3 is a transverse sectional view of the display unit.
Figure 4:
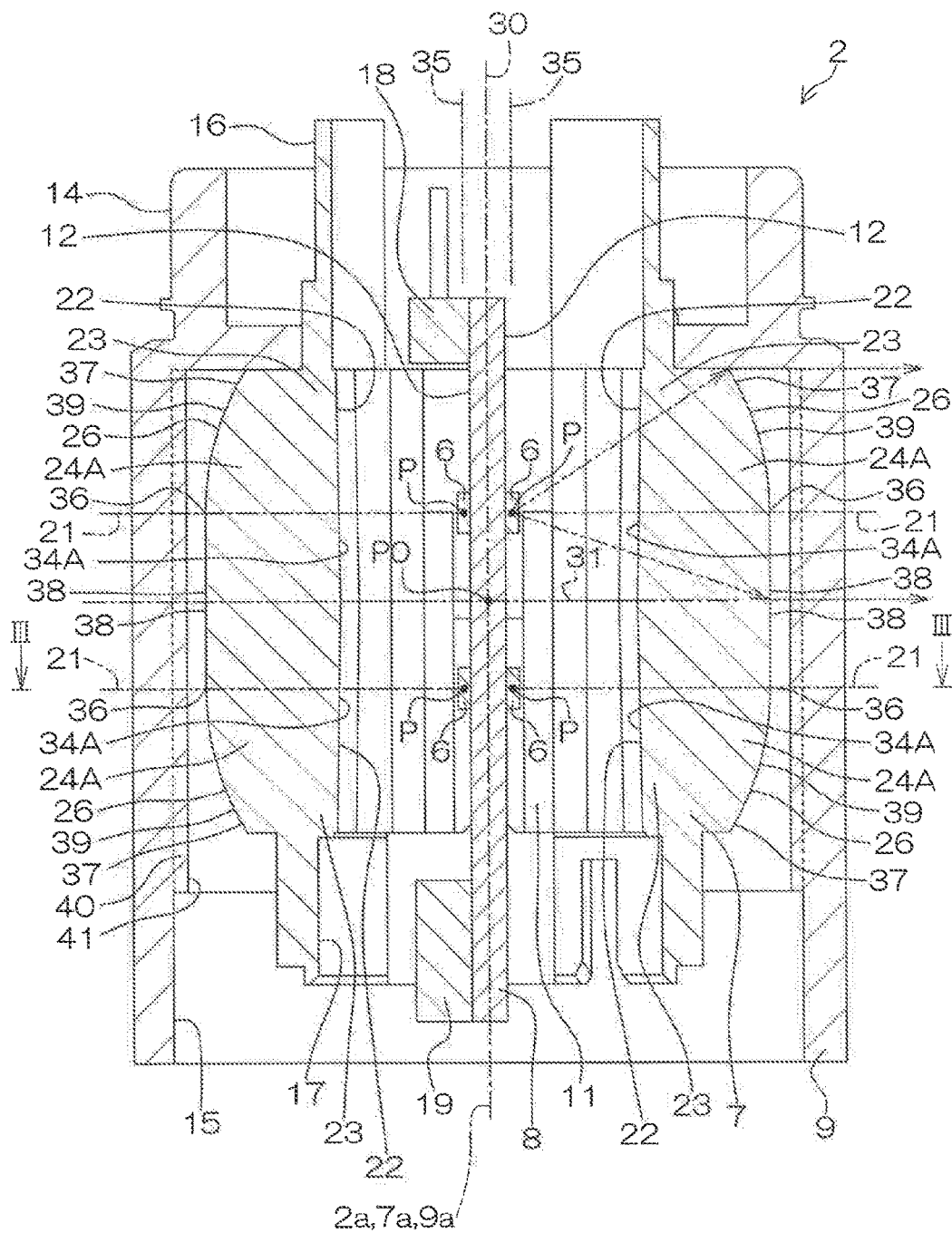
FIG. 4 is a longitudinal sectional view of the display unit.
Figure 5A:
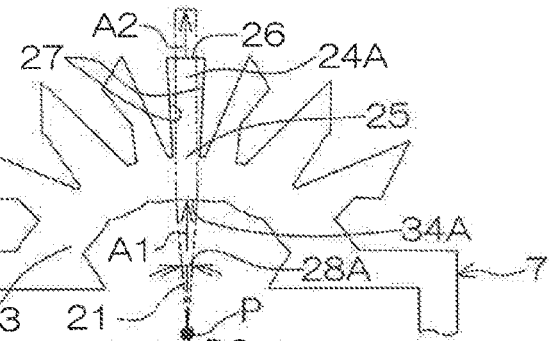
FIG. 5A to FIG. 5E are transverse sectional views, each showing a light distribution characteristic of a lens component included in the display unit.
Figure 5B:
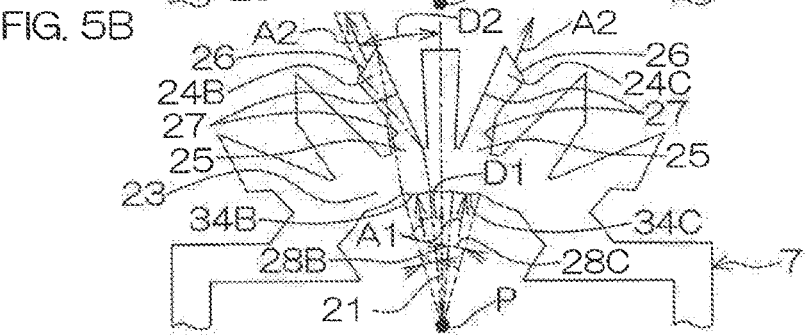
Figure 5C:
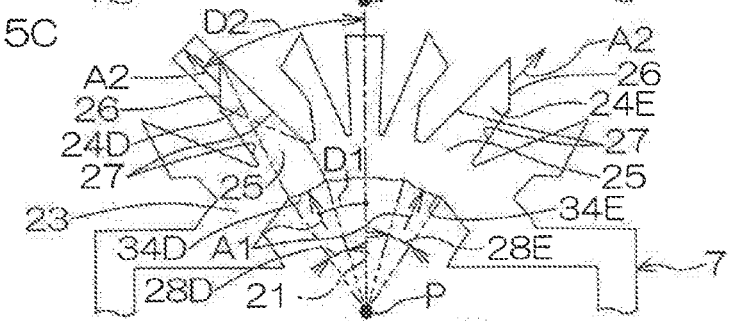
Figure 5D:
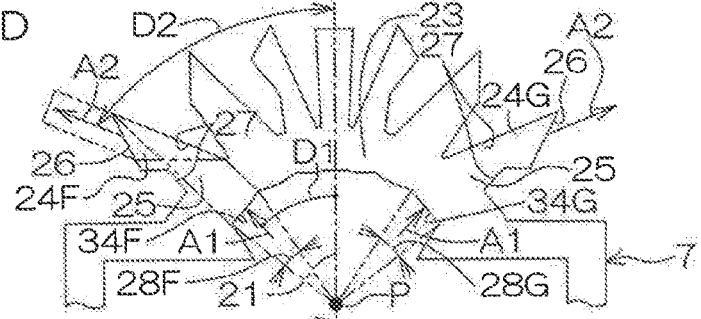
Figure 5E:
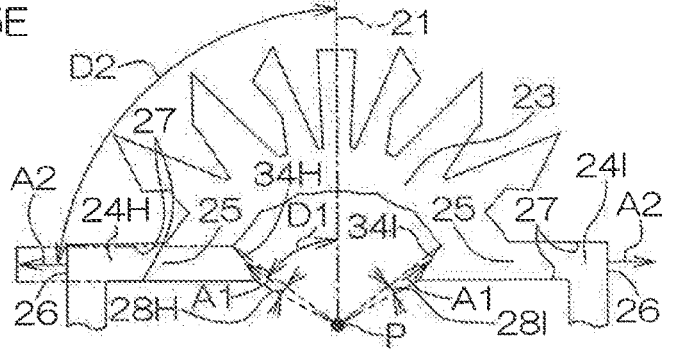
Figure 6:
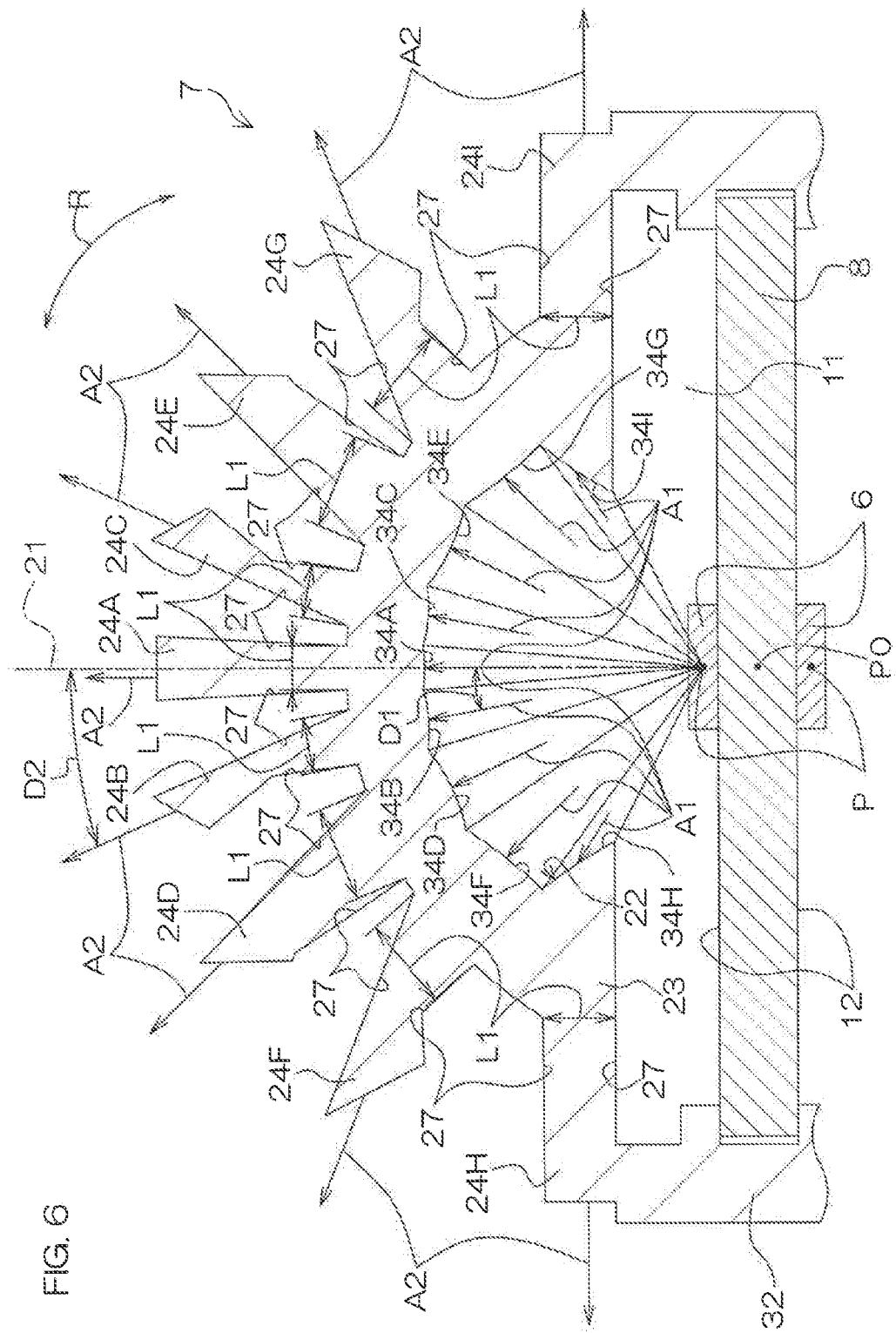
FIG. 6 is an enlarged transverse sectional view of a main part of the lens component.

FIG. 1 is a perspective view of a schematic arrangement of a stacked signal lamp 1 of a preferred embodiment of the present invention. FIG. 2 is an exploded perspective view of a display unit 2 included in the stacked signal lamp 1, and FIG. 3 is a transverse sectional view of the display unit 2, and FIG. 4 is a longitudinal sectional view of the display unit 2. FIG. 5A to FIG. 5E are transverse sectional views, each showing a light distribution characteristic of a main part of a lens component 7 included in the display unit 2. FIG. 6 is a transverse sectional view in which the main part of the lens component 7, a light source 6, etc., are enlarged.

With reference to FIG. 1, the stacked signal lamp 1 assumes a columnar shape that is long in one direction, and is disposed such that its longitudinal direction follows, for example, an up-down direction. The stacked signal lamp 1 may be disposed such that its longitudinal direction follows a direction other than the up-down direction.

The stacked signal lamp 1 includes a plurality of display units 2 each of which emits a light signal, a base unit 3 disposed at a base of the stacked signal lamp 1 from which electric power is supplied to the plurality of display units 2, and a top cover 4 disposed at a top of the stacked signal lamp 1. Although at least one display unit is required as the display unit 2, a description is provided concerning a case in which the number of the display units 2 is two in the present preferred embodiment.

The stacked signal lamp 1 is formed by connecting the top cover 4, the display units 2, and the base unit 3 together in a stacked state along its longitudinal direction. A lower end of the base unit 3 is arranged such that the stacked signal lamp 1 is attached to a predetermined attachment place (for example, a main portion of an automatic machine) directly or through an attachment member (not shown), such as a support pillar.

The display units 2 have substantially the same arrangement, and display light signals, respectively, in response to a command signal emitted from a controller (not shown). The light signal is radially emitted to its surroundings over the entire circumference of the surroundings. The controller may be contained in the base unit 3, or may be disposed outside the stacked signal lamp 1.

With reference to FIG. 2 and FIG. 3, the display unit 2 includes a plurality of light sources 6 each of which emits light, a tubular lens component 7 that guides light from the plurality of light sources 6 outwardly to its surroundings, a substrate 8 that supports the plurality of light sources 6, and a tubular or cylindrical cover 9 that surrounds the lens component 7 and that is translucent and circular in cross section.

The external shape of the display unit 2 is defined by the cover 9, and is a tubular or cylindrical shape that is circular in cross section. The lens component 7 is concentrically disposed inside the cover 9 in a nested manner. The lens component 7 and the cover 9 are formed as mutually different pieces, and are positionally adjusted to each other. A light-source containing portion 11 is formed inside the lens component 7, and the substrate 8 is longitudinally disposed here. Herein, the expression "longitudinally disposed" denotes that a principal surface of the substrate 8 is disposed in parallel with an axis 2a of the display unit 2. The substrate 8 has a pair of principal surfaces 12 parallel with each other. The principal surface 12 of the substrate 8 assumes a substantially rectangular shape having longitudinal sides, and is disposed such that the longitudinal sides become parallel with an axis 9a of the cover 9. The axis 9a of the cover 9 coincides with the axis 2a of the display unit 2. The gravity center of the substrate 8 is disposed on an axis 7a of the lens component 7 (or on the axis 9a of the cover 9), or is disposed near its axis.

With reference to FIG. 2 and FIG. 4, the display unit 2 is arranged so as to be connectable to another display unit 2 along the axis 2a. Additionally, the display unit 2 is arranged so as to be connectable to the base unit 3. Still additionally, the display unit 2 is arranged so as to be connectable to the top cover 4. Hereinafter, a description is provided concerning a case in which the display units 2 are connected to each other.

The cover 9 has connection portions 14 and 15 at both its ends, respectively, with respect to the axis 9a. The lens component 7 has connection portions 16 and 17 at both its ends, respectively, with respect to the axis 7a of the lens component 7. As a result, the lens component 7 is arranged such that a plurality of lens components are connectable to each other along the axis 7a. In other words, it is possible for the connection portions 16 and 17 to connect two lens components 7, which adjoin each other along the axis 7a, to each other. Additionally, a pair of connectors 18 and 19 are provided that are disposed in the light-source containing portions 11 of the adjoining lens components 7 respectively and that electrically connect the substrates 8 together.

The substrate 8 is a printed-circuit board in which a wiring pattern that forms a part of a circuit for a power supply to the light source 6 is printed on the principal surface, and is disposed such that the longitudinal direction of the substrate 8 becomes parallel with a direction in which the lens components 7 are connected together. The pair of connectors 18 and 19 are connected to the circuit formed on the substrate 8.

The connector 18 is fixed to one end of the substrate with respect to the longitudinal direction, and is electrically connectable to a corresponding connector (not shown) of a substrate (not shown) included in a unit adjacent to the end of the substrate 8. The connector 19 is fixed to the other end of the substrate 8 with respect to the longitudinal direction, and is electrically connectable to a corresponding connector (not shown) of a substrate (not shown) included in a unit adjacent to the other end of the substrate 8.

A plurality of, e.g., two light sources 6 are mounted on one principal surface 12 of the substrate 8. Likewise, a plurality of, e.g., two light sources 6 are mounted on the other principal surface 12 on the opposite side of the substrate 8 (see FIG. 4). The light sources 6 on both sides of the substrate 8 emit light in mutually opposite directions (both sides of the substrate 8).

Specifically, the light source 6 is a light emitting diode (hereinafter, referred to also as an "LED"). The LED is made of a light-emitting element chip. The light source 6 has a predetermined light distribution characteristic and an optical axis 21 corresponding to a central axis of the light distribution characteristic. The optical axis 21 of the light source 6 is perpendicular to a corresponding one of the principal surfaces 12 of the substrate 8. The optical axes 21 of a pair of light sources 6 that is one pair placed on the front and back sides of the substrate 8 (e.g., of two light sources 6 shown on the upper side in FIG. 4) coincide with each other, i.e., the optical axes 21 thereof lie on the same line. Likewise, the optical axes 21 of the other pair of light sources 6 that are placed away from the one pair coincide with each other.

Figure 7A:
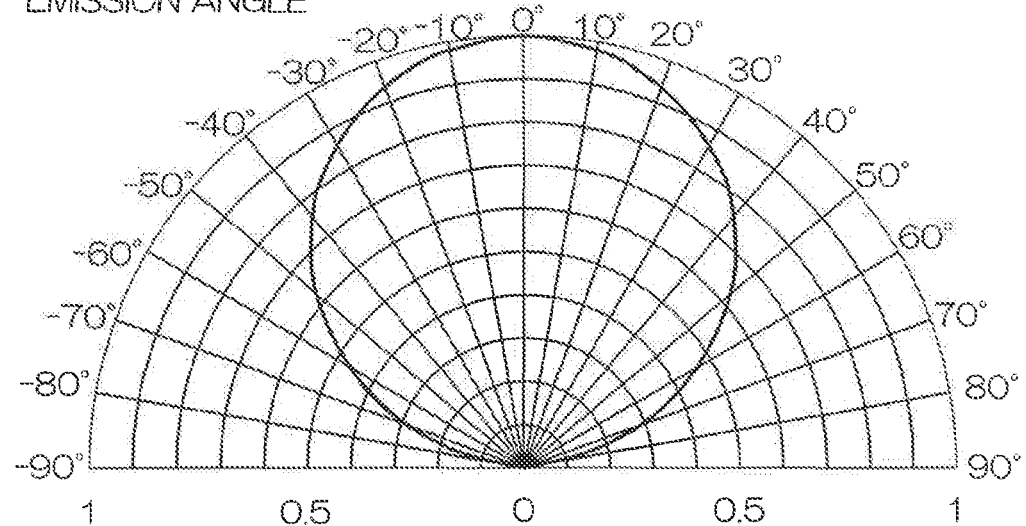
FIG. 7A and FIG. 7B are characteristic diagrams, each showing an example of a light distribution characteristic of an LED serving as a light source.

One example of the light distribution characteristic of the light source 6 is shown in FIG. 7A. In this light distribution characteristic, the luminosity in one direction along the optical axis 21 (also called a "main light-emission direction") is the maximum, and the luminosity decreases according to distance from the main light-emission direction, and the luminosity in a direction perpendicular to the main light-emission direction or in a direction making an angle of 90 degrees or more with the main light-emission direction is substantially zero.

The lens component 7 of the present preferred embodiment disperses light emitted from the light source 6 into a wider range by correcting the light distribution characteristic of the light source 6, thus obtaining uniform visibility when viewed from the entire circumference of the surroundings.

Although the arrangement of the light source 6 and the substrate 8 is hereinafter described in accordance with the aforementioned examples, the present invention is not limited to this. For example, the optical axes 21 of the pair of light sources 6 on the front and back sides of the substrate 8 may be arranged not to coincide with each other, or the light source 6 may be arranged so as to emit light in a direction other than the direction perpendicular to the principal surface 12 of the substrate 8, or a plurality of substrates 8 arranged such that the light source 6 is mounted on only one side of each substrate 8 may be used, or at least one of the connectors 18 and 19 may be eliminated. Additionally, it is only necessary to mount at least one light source 6 on one of the surfaces of the substrate 8.

Figure 7B:
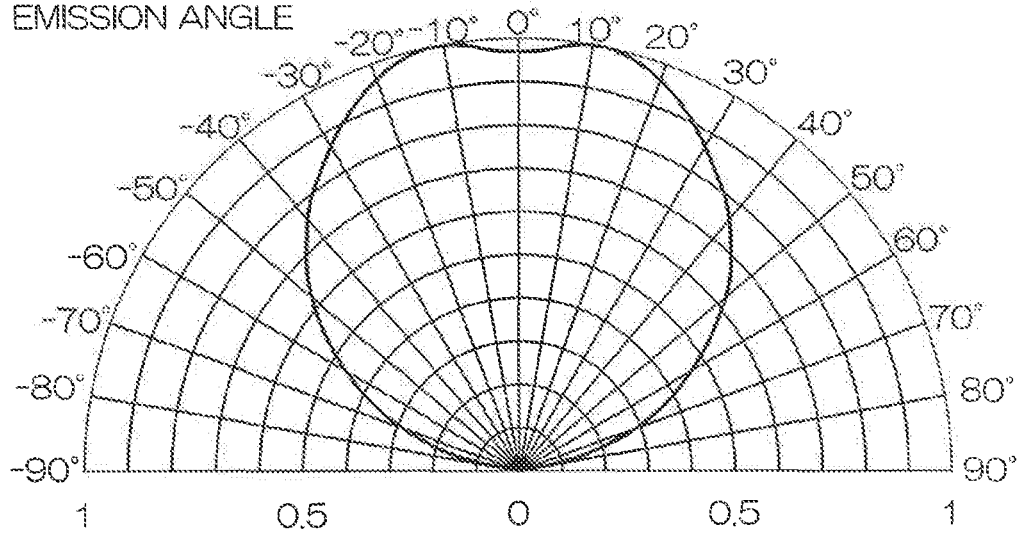

Additionally, as an example, although an LED that has a light distribution characteristic in which the luminosity monotonously decreases in accordance with the distance from the optical axis 21 (direction having an emission angle of 0°) as shown in FIG. 7A is described as the light source 6 applicable to the lens component 7, the present invention is not limited to this. For example, an LED of a light distribution characteristic that has the maximum luminosity in a direction making an angle with the main light-emission direction (direction along the optical axis 21; direction having an emission angle of 0°) may be used as the light source 6 as shown in FIG. 7B. It is only necessary for the light source 6 to have a light distribution characteristic in which the luminosity decreases in accordance with the distance from the optical axis 21, and, in more detail, it is only necessary for the light source 6 to have alight distribution characteristic in which the luminosity in a direction making a predetermined angle (e.g., 90 degrees) with the optical axis 21 is smaller than the luminosity in the direction of the optical axis 21 (i.e., the main light-emission direction). Both FIG. 7A and FIG. 7B are examples of these light distribution characteristics.

With reference to FIG. 3, the lens component 7 includes a predetermined light-source position P at which the light source 6 is placed, a light incidence portion 23 that forms an incidence surface 22 facing the light-source position P, and a plurality of light guiding portions 24A to 24I each of which branches from the light incidence portion 23 and extends radially with respect to the light-source position P and each of which is disposed so as to surround the light-source position P. In the present preferred embodiment, there are four light-source positions P, each of which is accompanied by one light incidence portion 23 and a plurality of, e.g., nine light guiding portions 24A to 24I. It should be noted that, in the present preferred embodiment, the incidence portions 23 corresponding to the two light-source positions P corresponding to the two light sources 6 mounted on the shared principal surface 12 of the substrate 8 are integrated with each other, and the plurality of light guiding portions 24A to 24I corresponding to these two light-source positions P, respectively, are integrated with each other.

Each of the light guiding portions 24A to 24I has a plate shape. In more detail, each of the light guiding portions 24A to 24I has a plate shape extending in parallel with a straight line 35 that is perpendicular to the optical axis 21 and that passes through the light-source position P. The straight line 35 is corresponding to a straight line parallel to the axis 7a of the lens component 7, and extends in a direction perpendicular to the sheet of FIG. 3. The light guiding portions 24A to 24I are radially disposed centering on the light-source position P as a whole. In a cross section (cross section represented in FIG. 3) that crosses the lens component 7, the light guiding portions 24A to 24I are disposed so as to assume a symmetrical shape along a circumferential direction R centering on the light-source position P on both sides between which the optical axis 21 extends.

The light guiding portion 24A is disposed along the optical axis 21. The light guiding portions 24B, 24D, 24F, and 24H are disposed in this order so as to recede from the optical axis 21 with respect to the light guiding portion 24A, and, on a side opposite to the side of these portions 24B, 24D, 24F, and 24H with the optical axis 21 placed between these two sides, the light guiding portions 24C, 24E, 24G, and 24I are disposed in this order so as to recede from the optical axis 21 with respect to the light guiding portion 24A. The light guiding portion 24B and the light guiding portion 24C have mutually symmetrical shape and disposition with the optical axis 21 therebetween. The light guiding portion 24D and the light guiding portion 24E have mutually symmetrical shape and disposition with the optical axis 21 therebetween. The light guiding portion 24F and the light guiding portion 24G have mutually symmetrical shape and disposition with the optical axis 21 therebetween. The light guiding portion 24H and the light guiding portion 24I have mutually symmetrical shape and disposition with the optical axis 21 therebetween. Concerning these light guiding portions 24B to 24I having symmetrical relationships and serving as pairs, only one portion of each pair will be chiefly described.

With reference to FIG. 5A to FIG. 5E, each of the light guiding portions 24A to 24I includes a basal end portion 25 joined to the light incidence portion 23, an emission end portion 26 that emits light outwardly away from the light source 6, and a pair of light-guide reflection surfaces 27 that guide light that has stricken the basal end portion 25 from the light incidence portion 23 to the emission end portion 26 while performing internal reflection. In FIG. 5A to FIG. 5E, these reference signs are given to only one part of the light guiding portions 24A to 24I.

The plurality of light guiding portions 24A to 24I are each designed as follows. In detail, among light rays emitted from the light source 6, light rays each of which has an angle with the optical axis 21 falling within predetermined light-source emission angle ranges 28A to 28I penetrate predetermined light guiding portions 24A to 24I arranged correspondingly to the light-source emission angle ranges 28A to 28I, respectively. The shape and size of each of the light guiding portions 24A to 24I are designed in accordance with each of the light-source emission angle ranges 28A to 28I. Hereinafter, the middle value of each of the light-source emission angle ranges 28A to 28I is referred to as a "light-source emission angle" in some cases.

In detail, light of the light-source emission angle range 28A penetrates the light guiding portion 24A. The light-source emission angle range 28A is an angular range that includes the optical axis 21 and that is set to be symmetrical with respect to the optical axis 21, and a light-source emission angle corresponding to this is 0 degrees.

Light of the light-source emission angle range 28B and light of the light-source emission angle range 28C penetrate the light guiding portions 24B and 24C, respectively. The light-source emission angle ranges 28B and 28C are angular ranges that are equal in extent to each other and that are disposed on mutually opposite sides with the light-source emission angle range 28A therebetween adjacently to the light-source emission angle range 28A, and are each larger in extent than the light-source emission angle range 28A. When the extent of an angular range is represented by the sign of the angular range, the relationship is 28B=28C>28A. Light-source emission angles corresponding to the light-source emission angle ranges 28B and 28C are equal to each other, and are relatively small acute angles (which do not include 0 degrees).

Light of the light-source emission angle range 28D and light of the light-source emission angle range 28E penetrate the light guiding portions 24D and 24E, respectively. The light-source emission angle ranges 28D and 28E are angular ranges that are equal in extent to each other and that are disposed adjacently to the light-source emission angle ranges 28B and 28C, respectively, on sides farther from the optical axis 21, and are larger in extent than the light-source emission angle ranges 28B and 28C, respectively. When the extent of an angular range is represented by the sign of the angular range, the relationship is 28D=28E>28B=28C. Light-source emission angles corresponding to the light-source emission angle ranges 28D and 28E are equal to each other, and are relatively middle acute angles larger than the light-source emission angles of the light-source emission angle ranges 28B and 28C.

Light of the light-source emission angle range 28F and light of the light-source emission angle range 28G penetrate the light guiding portions 24F and 24G, respectively. The light-source emission angle ranges 28F and 28G are angular ranges that are equal in extent to each other and that are disposed adjacently to the light-source emission angle ranges 28D and 28E, respectively, on sides farther from the optical axis 21, and are larger in extent than the light-source emission angle ranges 28D and 28E, respectively. When the extent of an angular range is represented by the sign of the angular range, the relationship is 28F=28G>28D=28E. Light-source emission angles corresponding to the light-source emission angle ranges 28F and 28G are equal to each other, and are relatively large acute angles larger than the light-source emission angles of the light-source emission angle ranges 28D and 28E.

The light-source emission angle ranges 28A to 28G and the light-source emission angles corresponding to these ranges are set so that the quantities of light emitted from the light source 6 toward the light-source emission angle ranges 28A to 28G become equal to each other.

Light of the light-source emission angle range 28H and light of the light-source emission angle range 28I penetrate the light guiding portions 24H and 24I, respectively. The light-source emission angle ranges 28H and 28I are angular ranges that are equal in extent to each other and that are disposed adjacently to the light-source emission angle ranges 28F and 28G, respectively, on sides farther from the optical axis 21. When the extent of an angular range is represented by the sign of the angular range, the relationship is 28H=28I. Light-source emission angles corresponding to the light-source emission angle ranges 28H and 28I are equal to each other, and are relatively large acute angles larger than the light-source emission angles of the light-source emission angle ranges 28F and 28G.

The extents of the light-source emission angle ranges 28H and 28I are set to be larger than half of the extent of the light-source emission angle range 28F and half of the extent of the light-source emission angle range 28G, respectively. In detail, the extents of the light-source emission angle ranges 28H and 28I are set so that the quantity of light penetrating the light guiding portion 24H and the quantity of light penetrating the light guiding portion 24I become approximately half of the quantity of light penetrating the light guiding portion 24F and approximately half of the quantity of light penetrating the light guiding portion 24G, respectively. The light guiding portion 24H (or the light guiding portion 24I) corresponding to the light-source emission angle range 28H (or the light-source emission angle range 28I) is adjacent to the light guiding portion 24H (or the light guiding portion 24I) on the opposite side of the substrate 8. These two light guiding portions 24H (or the two light guiding portions 24I) adjacent to each other are set to emit light in the same direction in cooperation with each other. Therefore, the total of the quantities of light penetrating these two light guiding portions 24H adjacent to each other becomes equal to the quantity of light penetrating each light guiding portion 24A to 24G other than the light guiding portions 24H.

The light-source position P is provided so as to correspond to each of the plurality of light sources 6, and, in the present preferred embodiment, four light-source positions P are provided. Four groups in total, each of which is a group consisting of the light incidence portion 23 and the plurality of light guiding portions 24A to 24I correspondingly to each light-source position P, are provided, and are arranged in the same way. These are formed so as to assume symmetrical shapes at four parts of the lens component 7, respectively, that are defined by a plane 30 that includes a center position P0 of the plurality of light-source positions P and that is parallel to the principal surface 12 of the substrate 8 (see FIG. 3 and FIG. 4) and by a plane 31 (see FIG. 4) that includes the center position P0 of the plurality of light-source positions P and that is perpendicular to the principal surface 12 of the substrate 8 and to the axis 7a of the lens component 7.

The lens component 7 additionally includes a light-source containing portion 11 that contains the plurality of light sources 6 disposed at the plurality of light-source positions P, respectively, through the substrate 8.

The light-source containing portion 11 is defined by the four light incidence portions 23 and by a pair of connection portions 32 that connect together edges of the light incidence portions 23 positioned on the sides opposite to each other with respect to the substrate 8. The connection portion 32 has a groove serving as a holding portion that holds long-side edges of the substrate 8. The light-source containing portion 11 is opened to both sides with respect to the axis 7a of the lens component 7, so that the light-source containing portion 11 is capable of containing the substrate 8 in its inside and is capable of connecting the connectors 18 and 19 to corresponding connectors of another display unit adjacent thereto. When the substrate 8 is contained and held in the light-source containing portion 11, each light source 6 of the substrate 8 is placed at a corresponding light-source position P of the lens component 7 so that the optical axis 21 follows a predetermined direction passing through the light guiding portion 24A.

The four groups corresponding to the plurality of light-source positions P, each of which consists of the light incidence portion 23 and the plurality of light guiding portions 24A to 24I, are integrally made of a translucent member. For example, a methacrylic resin, glass, or the like can be used as the translucent member. Additionally, the pair of connection portions 16 and 17 and the pair of connection portions 32 are made of the same material integrally therewith. The thus made lens component 7 has a basic external shape that is a rough outline of its external shape and that is formed in a tubular shape circular in cross section extending in parallel with a straight line that is perpendicular to the optical axis 21 and that passes through the light-source position P.

Hereinafter, the lens component 7 will be described based on one light-source position P among the four.

With reference to FIG. 5 and FIG. 6, the light incidence portion 23 assumes a cylindrical shape semicircular in cross section that faces the light-source position P. The light incidence portion 23 has the incidence surface 22 that is concaved toward the light-source position P. Light emitted from the light source 6 placed at the light-source position P enters the incidence surface 22.

The incidence surface 22 consists of a plurality of, e.g., nine incidence regions 34A to 34I. These nine incidence regions 34A to 34I are continuously connected together through mutually adjoining ones, and are provided to be identical in number with the light guiding portions 24A to 24I correspondingly to the nine light guiding portions 24A to 24I. Each of the plurality of incidence regions 34A to 34I is formed in a convexly curved shape that protrudes toward the light-source position P. The incidence surface 22 in which the plurality of incidence regions 34A to 34I are connected together assumes a concavely curved shape that is concaved so as to recede from the light-source position P as a whole.

The incidence region 34A is disposed so that the optical axis 21 passes through this region. The incidence regions 34B, 34D, 34F, and 34H are disposed in this order so as to recede from the optical axis 21 with respect to the incidence region 34A. On the side opposite to these regions, the incidence regions 34C, 34E, 34G, and 34I are disposed in this order so as to recede from the optical axis 21 with respect to the incidence region 34A.

The incidence regions 34A to 34I are disposed so as to face the basal end portions 25 of the light guiding portions 24A to 24I corresponding thereto, respectively, and allow light of the light-source emission angle ranges 28A to 28I corresponding thereto of the light source 6 to pass therethrough and to convert the light into parallel light, and allow the parallel light to enter the light guiding portions 24A to 24I corresponding thereto.

For example, the incidence regions 34A to 34G become wider in accordance with a distance from the optical axis 21. The incidence regions 34H and 34I are farthest away from the optical axis 21, and yet are made smaller than the incidence regions 34F and 34G adjacent to the side closer to the optical axis 21.

The extent of each of the incidence regions 34A to 34I can be represented as an angular range of the incidence region 34 faced from the light-source position P (referred to also as a "central angle") in a plane (corresponding to FIG. 5) that includes the optical axis 21 and that traverses the plurality of light guiding portions 24A to 24I. Specifically, the central angles of the incidence regions 34A to 34I coincide with the aforementioned light-source emission angle ranges 28A to 28I, respectively. Hereinafter, each of the central angles is given the same reference sign as each of the light-source emission angle ranges 28A to 28I corresponding thereto, and a description thereof is given.

Although the plurality of incidence regions 34A to 34I are equal in extent to each other with respect to a direction in which the axis 7a of the lens component 7 extends, the central angles 28A to 28I corresponding thereto are different. For example, the relationship is such that Central angle 28A of incidence region 34A<Central angle 28B of incidence region 34B=Central angle 28C of incidence region 34C<Central angle 28D of incidence region 34D=Central angle 28E of incidence region 34E<Central angle 28F of incidence region 34F=Central angle 28G of incidence region 34G.

The light guiding portions 24A to 24G are set so that quantities of incident light from the incidence regions 34A to 34G corresponding thereto become equal to each other, and, as a result, quantities of light penetrating the light guiding portions 24A to 24G become equal to each other.

The pairs of light-guide reflection surfaces 27 of the light guiding portions 24A to 24I are formed by pairs of the principal surfaces facing each other of the light guiding portions 24A to 24I which are each have a plate shape, and extend from the basal end portions 25 of the light guiding portions 24A to 24I to the emission end portions 26 thereof. In the light guiding portions 24A to 24G, an interval L1 (see FIG. 6) between the pair of light-guide reflection surfaces 27 of the basal end portion 25 is made wider in accordance with the light guiding portions 24A to 24G that are farther from the optical axis 21. Therefore, the interval L1 of the light guiding portion 24B is larger than the interval L1 of the light guiding portion 24A, and the interval L1 of the light guiding portion 24D is larger than that interval L1, and the interval L1 of the light guiding portion 24F is larger than that interval L1.

The light guiding portions 24H and 24I are set as follows. The light guiding portions 24H (or the light guiding portion 24I) of the lens component 7 corresponding to the pair of light sources 6 that emit light in mutually opposite directions, respectively, are adjacent to each other. These two light guiding portions 24H (or the two light guiding portions 24I) adjacent to each other are set to emit light in the same direction in cooperation with each other. The total of the quantities of light penetrating the two light guiding portions 24H (or the two light guiding portions 24I) adjacent to each other is set to become equal to the quantity of light penetrating each light guiding portion 24A to 24G other than the light guiding portions 24H. The total of the quantities of incidence light onto the two light guiding portions 24H (or the two light guiding portions 24I) adjacent to each other is set to become equal to the quantity of incidence light onto each light guiding portion 24A to 24G other than the light guiding portions 24H.

In a plane (equivalent to a transverse plane of the lens component 7) including the optical axis 21, the emission end portions 26 of the plurality of light guiding portions 24A to 24I are respectively disposed at a plurality of emission regions that are set to be away from each other so as to evenly divide a predetermined angular range with respect to a circumferential direction that centers on the light-source position P. For example, the predetermined angular range is an angular range of 180 degrees in which the direction along the optical axis 21 is at the center. This angular range is evenly divided in accordance with the number of the light guiding portions 24A to 24I including both ends, and nine emission regions are set so as to be away from each other. The emission end portions 26 of the light guiding portions 24A to 24I are respectively disposed at predetermined positions of these emission regions, e.g. central angle positions thereof.

The emission end portions 26 of the plurality of light guiding portions 24A to 24G emit light at mutually equal quantities of light.

Concerning the light guiding portions 24H and 24I, as described above, the total of the quantities of light from the emission end portions 26 of the two light guiding portions 24H and 24I of the lens component 7 respectively corresponding to the pair of light sources 6 that emit light toward mutually opposite sides is set to be equal to the quantity of light from the emission end portion 26 of each light guiding portion 24A to 24G other than the light guiding portions 24H and 24I.

In a plane that includes the optical axis 21 and that traverses the plurality of light guiding portions 24A to 24I, the emission end portions 26 of the plurality of light guiding portions 24A to 24I assume straight lines, respectively, and emit parallel light (see the alternate long and two short dashes line of FIG. 5A to FIG. 5E). The direction of the parallel light is set as follows.

In a plane (equivalent to a transverse plane of the lens component 7) including the optical axis 21, the emission end portions 26 of the plurality of light guiding portions 24A to 24I emit light in a plurality of emission directions A2, respectively, that evenly divide a predetermined angular range with respect to the circumferential direction that centers on the light-source position P. For example, the predetermined angular range is an angular range of 180 degrees in which the direction along the optical axis 21 is at the center. This angular range is evenly divided in accordance with the number of the light guiding portions 24A to 24I including both ends, and the emission directions A2 of the plurality of light guiding portions 24A to 24I are set. The emission directions A2 are a direction (0-degree direction) along the optical axis 21 and a plurality of directions that make angles of 22.5 degrees, 45 degrees, 67.5 degrees, and 90 degrees, respectively, with respect to the 0-degree direction on both sides of the 0-degree direction.

An angle D2 made by each of the emission directions A2 of the plurality of light guiding portions 24B to 24I with respect to the optical axis 21 is larger than an angle D1 made by a direction A1 in which light penetrating each of the light guiding portions 24A to 24I enters the light incidence portion 23 corresponding thereto with respect to the optical axis 21 (which is equivalent to each of the light-source emission angles corresponding to the light-source emission angle ranges 28A to 28I corresponding thereto). The angles D1 and D2 with respect to the directions A1 and A2 and with respect to the light guiding portion 24B are shown in FIG. 6. Additionally, the angles D1 and D2 with respect to the light guiding portions 24B, 24D, 24F, and 24H are shown in FIG. 5B to FIG. 5E.

With reference to FIG. 4, concerning the plurality of light guiding portions 24A to 24I, the emission end portion 26 has an intermediate part 36 and two ends 37 and 38 with respect to a direction in which the straight line 35 that is perpendicular to the optical axis 21 and that passes through the light-source position P extends (direction in which the axis 7a of the lens component 7 extends, which corresponds to the up-down direction in the sheet of FIG. 4). In FIG. 4, elements concerning only the light guiding portion 24A are shown. The end 37 that is one of the two ends is at the end position in the axial direction of the lens component 7. The other end 38 is at the central position in the axial direction of the lens component 7, and is adjacent to the end 38 of the emission end portion 26 of the light guiding portions 24A to 24I of the lens component 7 corresponding to one other light source 6 that emits light in the same direction. The emission end portion 26 has a linearly-contoured part along the axis 7a of the lens component 7 in the end 38, and has a convexly-contoured curved part 39 that protrudes in a direction away from the light-source position P in a region ranging from the end 37 to the intermediate part 36. This shape of the emission end portion 26 has a function to convert light emitted from the light source 6 into parallel light along a horizontal direction (direction perpendicular to the axis 7a of the lens component 7).

In a longitudinal section shown in FIG. 4, the optical axis 21 of the light source 6 follows the horizontal direction (direction perpendicular to the axis 7a of the lens component 7). Light from the light source 6 is radially emitted so as to assume a fan shape that spreads upwardly and downwardly centering on the light-source position P. Light passes through the light guiding portions 24A to 24I, and passes through the emission end portions 26 of the light guiding portions 24A to 24I, and hence is converted into parallel light that follows the horizontal direction (see the alternate long and two short dashes line of FIG. 4). Thereafter, the parallel light penetrates the cover 9.

With reference to FIG. 3 and FIG. 4, the cover 9 assumes a tubular or cylindrical shape that is circular in cross section, and is disposed outside the lens component 7, and functions as a globe. The cover 9 has a plurality of diffusing lens portions 40 serving as diffusing portions that diffuse light incident from the emission end portions 26 of the light guiding portions 24A to 24I of the lens component 7.

The diffusing lens portion 40 may have a lens portion provided in a one-to-one correspondence with respect to the emission end portions 26 of the light guiding portions 24A to 24I corresponding thereto. In other words, parallel light from the emission end portions 26 of the light guiding portions 24A to 24I may enter one specific diffusing lens portion 40 corresponding thereto.

In detail, the diffusing lens portion 40 has a convex lens surface 41 that is formed in a convex shape and that faces the emission end portion 26 corresponding thereto. In the present preferred embodiment, the convex lens surface 41 is formed on a surface of a semicircular-in-cross-section projection formed on the inner peripheral surface of the cover 9, and this projection extends in parallel with the axis 9a of the cover 9 in a predetermined range in the axial direction of the cover 9.

FIG. 8 is an enlarged cross-sectional view of a main part of the display unit 2, showing a modification of the cover 9.

The diffusing lens portion 40 may be formed of a concave lens surface 42 that is concaved with respect to the emission end portion 26 corresponding thereto, instead of the convex lens surface 41. For example, the concave lens surface 42 may be a surface of a concave that is semicircular in cross section and that is formed on the inner peripheral surface of the cover 9. Without being limited to the surface of a projection or of a concave, the convex lens surface or the concave lens surface may be, for example, a surface of a dot-shaped projection or a hollow surface. Additionally, both the convex lens surface and the concave lens surface may be formed on the cover 9.

The diffusing portion of the cover 9 may have a diffusing material (not shown) that diffusely reflects light inside or may have a pearskin-finished surface (not shown) that is capable of diffusing light, instead of the diffusing lens portion 40.

In the example of FIG. 3, the projections formed on the inner surface of the cover 9 are larger in number than the emission end portions 26. Although a projection that does not correspond to the emission end portion 26 has an arrangement identical with that of the diffusing lens portion 40, this projection does not function as the diffusing lens portion 40, and is a dummy diffusing lens portion. The dummy diffusing lens portion is capable of making it difficult to see the inside of a part that does not participate in light emission in the lens component 7 and is capable of improving the visual quality of the display unit 2.

With reference to FIG. 3 to FIG. 5E, light is radially emitted in mutually opposite directions from the four light sources 6 along the horizontal direction in the present preferred embodiment. Light enters the lens component 7, and is divided and guided to the plurality of light guiding portions 24A to 24I. As a result, light is distributed in a plurality of directions set in even angular ranges around the light-source position P so as to be equal to each other in the quantity of light, and is emitted from the emission end portions 26 of the plurality of light guiding portions 24A to 24I in the form of parallel light. In more detail, the quantities of light emitted from the light guiding portions 24A to 24G are equal to each other, and the total of the quantities of light emitted from the emission end portions 26 of the two light guiding portions 24H and 24I in the same direction is equal to the quantity of light emitted from each light guiding portion 24A to 24G other than the light guiding portions 24H and 24I. Light emitted from the lens component 7 is diffused by the diffusing lens portion 40 of the cover 9 and is emitted to its surroundings. The thus formed display unit 2 has a light emission part that is seen at uniform brightness even when it is seen from any direction of the surroundings, and therefore it is possible to realize high visibility.

As thus described, in the present preferred embodiment, the light incidence portion 23 of the lens component 7 and the plurality of light guiding portions 24A to 24I of the lens component 7 form a light distribution structure. Additionally, the light incidence portion 23 of the lens component 7, the plurality of light guiding portions 24A to 24I of the lens component 7, and the diffusing portion of the cover 9 form a light distribution structure. This light distribution structure is formed so that the ratio of luminosity in a predetermined direction making a predetermined angle with the optical axis 21 with respect to luminosity in a direction along the optical axis 21 becomes larger than a corresponding ratio in the light distribution characteristic of the light source 6 in light emitted from the light distribution structure.

Light that is emitted from one light source 6 and that is emitted from the lens component 7 will be described in detail. Let it be supposed that light passing through the light guiding portion 24A is light in the direction along the optical axis 21 and be supposed that luminosity in this direction is "1." Next, light passing through the light guiding portion 24H (or, alternatively, the light guiding portion 24I) is light in a direction making a predetermined angle of 90 degrees with the optical axis 21, and, in comparison with the light guiding portion 24A, is half in the quantity of light and is substantially equal in the area of the emission end portion 26. Therefore, luminosity in a direction making an angle of 90 degrees with the optical axis 21 is "0.5." The ratio of luminosity "0.5" in the direction making an angle of 90 degrees with the optical axis 21 with respect to luminosity "1" in the direction along the optical axis 21 in light emitted from the light distribution structure is 0.5.

On the other hand, in the light distribution characteristic of the light source 6 (see FIG. 7A), the ratio of luminosity "0" in the direction making an angle of 90 degrees with the optical axis 21 with respect to luminosity "1" in the direction along the optical axis 21 is 0.

Therefore, the ratio (0.5) of luminosity in the predetermined direction making an angle of 90 degrees with the optical axis 21 with respect to luminosity in the direction along the optical axis 21 in light emitted from the light distribution structure (the light guiding portions 24A and 24H) is larger than a corresponding ratio (0) in the light distribution characteristic of the light source 6.

The same applies to the whole (four light sources 6) of the lens component 7. In other words, concerning the light distribution structure, light in the direction along the optical axis 21 is light that passes through the light guiding portion 24A from the two light sources 6. Light in the direction making an angle of 90 degrees with the optical axis 21 is light that passes through the four light guiding portions 24H from the four light sources 6.

Therefore, the ratio (1) of luminosity "2" in a predetermined direction making an angle of 90 degrees with the optical axis 21 with respect to luminosity "2" in the direction along the optical axis 21 in light emitted through the light distribution structure (light guiding portions 24A and 24H) from the four light sources 6 is larger than a corresponding ratio (0) in the light distribution characteristic of the four light sources 6.

Additionally, the diffusing portion of the cover 9 emits light in directions obtained by evenly dispersing the incident direction of light incident onto the cover 9. Therefore, the ratio of luminosity in a predetermined direction making an angle of 90 degrees with the optical axis 21 with respect to luminosity in the direction along the optical axis 21 in light emitted from the light distribution structure (light guiding portions 24A and 24H) including the diffusing portion of the cover 9 is the same as in a case in which the diffusing portion of the cover 9 is not included, and the same result as above is obtained.

Likewise, the aforementioned ratio relationship is established in the light distribution characteristic of the light sources 6 when consideration is given to light in a light guiding direction (direction parallel to the light-guide reflection surface 27) of the other light guiding portions 24B to 24G along a direction making an acute angle with the optical axis 21 instead of the emission direction of light emitted from the emission end portions 26 of the light guiding portions 24H and 24I. However, if the aforementioned ratio relationship is established in light (in the emission direction or in the light guiding direction from the emission end portion 26) of the light guiding portions 24H and 24I making the largest angle with the optical axis 21, a most excellent effect will be fulfilled.

As described above, in spite of the fact that the light source 6 has a light distribution characteristic in which luminosity becomes smaller in accordance with a distance from the optical axis 21, the luminosity of light in a direction away from the optical axis 21 is restrained from being reduced concerning light that penetrates the lens component 7 in comparison with that light distribution characteristic. Therefore, it is possible to restrain irregularity in visibility of the display unit 2 of the stacked signal lamp 1, and it is possible to heighten visibility. Moreover, it is possible to heighten visibility regardless of the light distribution characteristic of the light source 6, and therefore it is possible to raise the degree of freedom of the disposition of the light source 6, and hence is possible to reduce production costs of the display unit 2. For example, the longitudinal disposition of the substrate 8 on which the light source 6 is mounted makes it possible to use the general-purpose connectors 18 and 19 for an electrical connection between the substrates 8 and hence makes it possible to reduce costs.

Additionally, the quantities of incident light onto the plurality of light guiding portions 24A to 24G that differ from each other in distance from the optical axis 21 (for example, the light guiding portion 24A and the light guiding portions 24B to 24G) are made equal to each other. This makes it possible to make the quantities of light penetrating the light guiding portions 24A to 24G equal to each other, and hence makes it possible to further improve visibility.

As thus described, in order to make the quantities of incident light equal to each other, the interval L1 between the pair of light-guide reflection surfaces 27 of the light guiding portions 24B to 24G (second light guiding portion) farther from the optical axis 21 is made larger than the interval L1 between the pair of light-guide reflection surfaces 27 of the light guiding portions 24A to 24E (first light guiding portion) closer to the optical axis 21 (see FIG. 6). This makes it possible to easily make the quantities of incident light onto these light guiding portions 24A to 24G equal to each other.

Additionally, the incidence surface 22 is disposed so as to face the basal end portions 25 of the plurality of light guiding portions 24A to 24I, and the plurality of incidence regions 34A to 34I are provided so that light from the light source 6 is converted into parallel light and is allowed to enter the light guiding portions 24A to 24I corresponding thereto. As a result, in accordance with each part corresponding to directions in which light is emitted from the light source 6, light from the light source 6 passes through the incidence regions 34A to 34I corresponding thereto, and is guided to the light guiding portions 24A to 24I corresponding thereto while restraining the subsequent spread.

This makes it possible to allow light that has stricken each incidence region 34A to 34I to reliably enter each light guiding portion 24A to 24I corresponding thereto. In other words, this makes it possible to reliably distribute light to the plurality of light guiding portions 24A to 24I. Additionally, light is converted into parallel light by means of the incidence regions 34A to 34I toward the light guiding portions 24A to 24I corresponding thereto, and therefore it is possible to reliably guide light that has stricken the incidence regions 34A to 34I to the light guiding portions 24A to 24I without enlarging the basal end portions 25 of the light guiding portions 24A to 24I. Therefore, it is possible to restrain the basal end portions 25 of the light guiding portions 24A to 24I from being enlarged, and hence is possible to heighten the degree of freedom of the design of the light guiding portions 24A to 24I and thus the lens component 7, and therefore it is possible to contribute to the improvement of visibility and to the reduction of production costs.

Although the whole of the incidence surface 22 converts incident light into parallel light in the preferred embodiment shown in FIG. 3 described above, the present invention is not limited to this. For example, even if a part of the incidence surface 22 converts incident light into parallel light, the aforementioned effect can be obtained. Additionally, at least one part of the incidence surface 22 may gather or condense incident light.

Additionally, in the present preferred embodiment, when two of the incidence regions 34A to 34G that differ from each other in distance from the optical axis 21 are compared with each other, the incidence regions 34B to 34G (second incidence region) farther from the optical axis 21 are made wider than the incidence regions 34A to 34E (first incidence region) closer to the optical axis 21. This makes it possible to introduce a larger quantity of light into the incidence regions 34B to 34G farther from the optical axis 21 in which the quantity of light for each unit area is reduced than the incidence regions 34A to 34E closer to the optical axis 21 because of the light distribution characteristic of the light source 6. As a result, it is possible to increase the quantity of light penetrating the light guiding portions 24B to 24G corresponding to the incidence regions 34B to 34G farther from the optical axis 21. Therefore, it is possible to obtain high visibility.

Still additionally, in the present preferred embodiment, concerning the angular ranges 28A to 28G of the incidence regions 34A to 34G faced from the light-source position P, the angular range of the incidence regions (second incidence region) farther from the optical axis 21 is made wider than the angular range of the incidence regions (first incidence region) closer to the optical axis 21. This facilitates a design to make the incidence regions 34B to 34G farther from the optical axis 21 wider than the incidence regions 34A to 34E closer to the optical axis 21. As a result, it is possible to contribute to the improvement of visibility and to the reduction of production costs.

Additionally, the plurality of light guiding portions 24B to 24I are designed so that an angle D2 that light emitted from the emission end portion 26 makes with the optical axis 21 becomes larger than an angle D1 that the light emitted therefrom makes with the optical axis 21 when the light enters the light incidence portion 23. As a result, the direction of light changes to recede from the optical axis 21 before and after passing through the light guiding portions 24A to 24I. Therefore, it is possible to efficiently guide light in a direction making a large angle with the optical axis 21, and therefore this is desirable for realizing a light distribution structure.

Additionally, the emission end portions 26 of the plurality of light guiding portions 24A to 24I are disposed so as to evenly divide a predetermined angular range with respect to the circumferential direction R that centers on the light-source position P and that is along a plane (transverse plane) including the optical axis 21. This makes it possible to restrain irregularity in visibility with respect to the circumferential direction R of the lens component 7 and makes it possible to further raise visibility.

Additionally, the emission end portions 26 of the plurality of light guiding portions 24A to 24G are designed to emit light at mutually equal quantities of light. This makes it possible to restrain irregularity in visibility with respect to the circumferential direction R of the lens component 7 and makes it possible to further improve visibility.

Additionally, the emission directions A2 from the emission end portions 26 of the plurality of light guiding portions 24A to 24I are set to be directions that evenly divide a predetermined angular range with respect to the circumferential direction R that centers on the light-source position P and that is along a plane (transverse plane of the lens component 7) including the optical axis 21. This makes it possible to restrain irregularity in visibility with respect to the circumferential direction R of the lens component 7 and makes it possible to further raise visibility.

Additionally, the plurality of plate-shaped light guiding portions 24A to 24I have the convex emission end portion 26 in the longitudinal section of the lens component 7, and hence has a light gathering or condensing function. As a result, even if the direction of light emitted from the light source 6 spreads radially in the longitudinal section, its spread is restrained by passing through the light guiding portions 24A to 24I. As a result, it is possible to emit light in a specific direction, and hence is possible to improve visibility.

Additionally, the emission end portion 26 emits parallel light when viewed in the transverse plane of the lens component 7. This makes it possible to fix the direction of light emitted from the emission end portion 26. For example, it becomes easy to design the cover 9 that is an optical component having a diffusing function.

Additionally, the translucent cover 9 having a diffusing portion that diffuses light from the lens component 7 is provided, and, as a result, it is possible to restrain irregularity in visibility when the display unit 2 is seen from its surroundings.

Additionally, the diffusing lens portion 40 is provided as a diffusing portion. This makes it possible to adjust a diffusion status or visual perception from the surroundings by adjusting a design variable of the diffusing lens portion 40. Therefore, it is possible to further raise visibility.

The diffusing lens portion 40 is set as the convex lens surface 41 or as the concave lens surface 42, and, as a result, it is possible to diffuse light with a simple arrangement.

Additionally, the emission end portion 26 and the diffusing lens portion 40 are provided so as to have a one-to-one correspondence, and therefore it is easy to design the display unit 2 to improve visibility.

Additionally, the pair of light sources 6 that share the optical axis 21 and that emit light in mutually opposite directions are provided. This makes it possible to improve visibility from the entire circumference.

Additionally, these light sources 6 serving as a pair are mounted on both sides of the substrate 8, respectively, and the substrate 8 is disposed in the cylindrical-shaped light-source containing portion 11 of the lens component 7, and, as a result, it is possible to place the light source 6 at the light-source position P surrounded by the light guiding portions 24A to 24I. This makes it possible to realize the display unit 2 having a light distribution structure as a practicable structure. For example, it is possible to longitudinally dispose the substrate 8, and therefore it is easy to simplify the structure to supply electric power to the substrate 8.

Additionally, a plurality of lens components 7 are connectable to each other along the axis 7a, and a plurality of substrates 8 are disposed in the light-source containing portions 11 of a plurality of lens components 7, respectively. Additionally, the substrates 8 disposed in the light-source containing portions 11, respectively, of adjoining lens components 7 are electrically connected together by means of the connectors 18 and 19. This makes it possible to use the plurality of lens components 7 connected together, and makes it possible to electrically connect the substrates 8 together by means of the connectors 18 and 19, which are general-purpose ones, with ease.

Additionally, the present preferred embodiment can be modified as follows. In the following, a description will be made centering on respects in which modifications differ from the aforementioned preferred embodiment. The other arrangements are the same as in the aforementioned preferred embodiment.

FIG. 9A and FIG. 9B are each a transverse sectional view of a main part of the lens component 7, showing a modification of the light emission end 26 of the lens component 7, in which the light guiding portions 24A, 24B, 24D, and 24H are shown in an enlarged view.

Although the emission end portion 26 assumes a straight line in a plane that includes the optical axis 21 and that traverses the plurality of light guiding portions 24A to 24I in the aforementioned preferred embodiment (see FIG. 3), the present invention is not limited to this. For example, as shown in FIG. 9A, the emission end portion 26A may form a lens surface that assumes a convex curve that protrudes outwardly. Alternatively, as shown in FIG. 9B, the emission end portion 26B may form a lens surface that assumes a concave curve that is concaved outwardly. In these cases, the emission end portions 26A and 26B form diffusing portions, respectively. Light penetrates the emission end portions 26A and 26B, and is then emitted as non-parallel diffusion light.

FIG. 10 is a transverse sectional view of a main part of the display unit 2, showing a modification of a correspondence relationship between light emission ends 26C of the light guiding portions 24A to 24I of the lens component 7 and the cover 9.

Although light from the emission end portion 26 is parallel light, and a one-to-one correspondence relationship exists between the emission end portion 26 and the diffusing lens portion 40 of the cover 9 in the aforementioned preferred embodiment of FIG. 3, the present invention is not limited to this. For example, as shown in FIG. 10, the emission end portion 26C may emit nonparallel light in a plane that includes the optical axis 21 and that traverses the plurality of light guiding portions 24A to 24I. In this case, the emission end portion 26C is capable of diffusing light, and therefore it is possible to further improve visibility. In detail, the emission end portion 26C may have a pearskin-finished surface that serves as a diffusing portion and that has many fine rugged parts.

Additionally, light that has been diffused from the emission end portion 26 enter a plurality of (e.g., three) diffusing lens portions 40 close thereto, e.g., enters a diffusing lens portion 40 of the inner surface of the cover 9 that is closest to the emission end portion 26 and other diffusing lens portions 40 adjacent to both sides of the diffusing lens portion 40 closest thereto. The number of diffusing lens portions 40 stricken by diffused light may be two or may be four or more.

As thus described, the emission end portion 26C corresponds to the plurality of diffusing lens portions 40 provided consecutively, and therefore it is possible to widely diffuse light from the single emission end portion 26C through the plurality of diffusing lens portions 40 of the cover 9. As a result, it is possible to further improve visibility.

For example, the lens surface shown either in FIG. 9A or in FIG. 9B may be used as a diffusing portion, in addition to the pearskin-finished surface.

Besides, the following modifications are conceivable. In detail, the emission end portion that has a diffusing portion may correspond to a single diffusing lens portion 40, instead of corresponding to the plurality of diffusing lens portions 40 provided consecutively. Additionally, the emission end portion 26 that does not have a diffusing portion may correspond to a plurality of diffusing lens portions 40 provided consecutively.

FIG. 11 is a transverse sectional view of the display unit 2, showing a modification in which the lens component 7 and the cover 9 of the display unit 2 are integrated with each other.

Although the lens component 7 and the cover 9 are formed as mutually different pieces and as parts independent of each other in the aforementioned preferred embodiment shown in FIG. 3, the present invention is not limited to this. For example, as shown in FIG. 11, an integrally molded piece 43 in which the lens component 7 and the cover 9 are formed integrally with each other as a single member may be used. In this case, it is possible to reduce the number of elements, and therefore it is possible to reduce a time-consuming job for assembly, thus contributing to a decrease in production costs.

For example, a pair of connection portions 44 that connect the lens component 7 and the cover 9 together through the connection portion 32 are provided. The connection portions 32, 44, the lens component 7, and the cover 9 are formed integrally with each other.

FIG. 12 is a transverse sectional view of the display unit 2, showing a modification when the lens component 7 of the display unit 2 has a semicircular shape in cross section.

The external shape of the lens component 7 and that of the cover 9 are each formed in a semicircular shape in cross section. Additionally, a pair of connection portions 45 that connect the lens component 7 and the cover 9 together are provided. An integrally molded piece 46 consists of the pair of connection portions 45, the lens component 7, and the cover 9 that are formed integrally with each other.

The substrate 8 is attached to a plate-shaped attachment member 47. The substrate 8 and the attachment member 47 are contained in the light-source containing portion 11 of the lens component 7 and are fixed there.

As shown by the alternate long and two short dashes line in FIG. 12, two integrally molded pieces 46 are prepared, and the connection portions 45 thereof are placed along each other and are joined together, and, as a result, it is possible to forma display unit having a circular shape in cross section.

FIG. 13 is a transverse sectional view of the display unit 2, showing another modification when the lens component 7 of the display unit 2 has a semicircular shape in cross section.

The external shape of the lens component 7 and that of the cover 9 are each formed in a semicircular shape in cross section, and are formed as mutually different pieces. The substrate 8 is attached to the plate-shaped attachment member 47. The substrate 8 is fixed to the lens component 7 through the attachment member 47 in a state of being contained in the light-source containing portion 11 of the lens component 7. The lens component 7 and the cover 9 are fixed to each other through the attachment member 47.

As shown by the alternate long and two short dashes line in FIG. 13, two assembled products 48 in each of which the attachment member 47, the lens component 7, and the cover 9 are fixed to each other are prepared, and the attachment members 47 of the two assembled products 48 are placed along each other and are joined to each other, and, as a result, it is possible to form a display unit having a circular shape in cross section.

As shown by the alternate long and two short dashes line in FIG. 12 and FIG. 13, the lens component 7 may form a a divided piece that is shaped by dividing a tubular or cylindrical external shape into a plurality of pieces in the circumferential direction, and a plurality of such divided pieces may be joined to each other in the circumferential direction R to make up a tubular or cylindrical external shape. According to this arrangement, the divided pieces of the lens component become simpler in shape than in a case in which the lens component is not divided, and therefore it is possible to easily produce the device. For example, a pair of lens components each of which forms the region of approximately a half of a circle (about 180 degrees) around a light source are combined together in a cross-section of a display unit, and, as a result, it is possible to form a lens component that surrounds almost the whole circumference (about 360 degrees) around the light source. Additionally, it is possible to form a lens component that is capable of meeting various angular ranges by use of a few kinds of basic lens components.

FIG. 14 is a transverse sectional view showing another modification of the display unit 2.

Without being limited to a circular shape in cross section or a semicircular shape in cross section, the shape of the lens component 7 and that of the cover 9 may be other shapes, and may be, for example, a tubular or cylindrical external shape having a rectangle in cross section. A corner portion of this tubular shape is formed by a convex curved plane. Additionally, a diffusing lens portion 40 (only one part of which is shown in the figure) is formed on the inner surface of the cover 9 correspondingly to the plurality of light guiding portions 24A to 24I of the lens component 7. The lens component 7 is arranged in the same manner as the one used in the display unit 2 shown in FIG. 3.

FIG. 15 is a perspective view of a stacked signal lamp 1 that includes a display unit 2 having a partially cut-off shape that is still another modification of the display unit 2.

The stacked signal lamp 1, the display unit 2, the lens component 7, and the cover 9 have an external shape extending along a central axis 2a parallel to a straight line that is perpendicular to an optical axis and that passes through a light-source position in which a tubular or cylindrical shape is partially cut off in the circumferential direction R, and this external shape may have a central angle D3 that exceeds 180 degrees around the central axis 2a. The thus cut-off part is usable for attachment. For example, it is possible to mention a part in which the central angle D3 is 270 degrees, and a cut-off part assumes 90 degrees in the external shape. If the lens component 7 or the display unit 2 has this external shape, it is possible to form the stacked signal lamp 1 that can be installed such that the cut-off part is placed along a corner portion in which wall surfaces 60 are connected together with 90 degrees therebetween.

FIG. 16 is a transverse sectional view of still another modification of the lens component 7.

The lens component 7 of the display unit 2 shown in FIG. 16 differs from the lens component 7 shown in FIG. 3 in the following respects, and, other than those respect, is arranged in the same way as the lens component 7 of FIG. 3 although not described in detail. Additionally, the light source 6 and the substrate 8 of FIG. 16 are arranged in the same way as those of FIG. 3. Additionally, the cover 9 of FIG. 3 is likewise used as a cover although the cover 9 is not shown in FIG. 16.

The lens component 7 has a tubular or cylindrical external shape that is circular in cross section. The lens component 7 has two half portions, i.e., a first half portion 51 and a second half portion 52 (an example of divided pieces) obtained by dividing the external shape into a plurality of pieces, e.g., into two pieces in the circumferential direction R, and hence assumes a tubular external shape circular in cross section by allowing these two half portions 51 and 52 to be joined to each other in the circumferential direction by means of the pair of connection portions 32. In other words, the lens component 7 includes the first half portion 51 disposed on the side of the principal surface 12 that is one of the principal surfaces of the substrate 8, the second half portion 52 disposed on the side of the principal surface 12 that is the other one of the principal surfaces of the substrate 8, and the pair of connection portions 32 that join these half portions together outside both lateral side parts of the substrate 8, and, in the present preferred embodiment, these are molded integrally with each other.

The first half portion 51 faces two light sources 6 mounted on one principal surface 12 of the substrate 8, whereas the second half portion 52 faces two light sources 6 mounted on the other principal surface 12 of the substrate 8.

The substrate 8 is disposed while being offset at a predetermined distance L2 from the axis 7a of the lens component 7 in a direction along the optical axis 21 of the light source 6 mounted on the substrate 8 in a transverse sectional view. In accordance with this, the two shapes, i.e., the shape of the first half portion 51 and the shape of the second half portion 52 differ from each other.

The disposition of the substrate 8 being offset makes it possible to make a space between one principal surface 12 of the substrate 8 (for example, the principal surface 12 shown on the upper side in FIG. 16) and the incidence surface 22 of the first half portion 51 that is one of the divided pieces of the lens component 7 and that faces the one principal surface wider than the disposition of the substrate 8 not being offset. Therefore, in the present preferred embodiment, the connectors 18 and 19 are disposed on one of the principal surfaces 12 of the substrate 8. In other words, the connectors 18 and 19 are mounted on the principal surface 12 (first principal surface) on the side closer to the axis 7a that is one of the pair of principal surfaces 12 of the substrate 8. The distance from the light source 6 mounted on the first principal surface 12 to the incidence surface 22 facing this principal surface 12 is longer than the distance from the principal surface 12 on the opposite side (second principal surface on the side farther from the axis 7a) to the incidence surface 22 facing the second principal surface. Accordingly, a wide space is secured to dispose the connectors 18 and 19, and therefore the degree of freedom of the selection of the connectors 18 and 19 that can be disposed on the first principal surface 12 is raised. As a result, it becomes easy to apply general-purpose products to the connectors 18 and 19, thus contributing to a decrease in production costs of the display unit 2.

The whole of the incidence surface 22 converts light from the light source 6 into parallel light in the preferred embodiment of FIG. 3, and, on the other hand, in the incidence surfaces 22 of the two first and second half portions 51 and 52 of FIG. 16, the incidence regions 34B to 34G that are a part of the entire incidence regions gather and guide light from the light source 6 to the light guiding portions 24B to 24G corresponding thereto, and the remaining incidence regions 34A, 34H, and 34I convert it into parallel light and guide the resulting parallel light to the light guiding portions 24A, 24H, and 24I corresponding thereto.

Additionally, although the distance from the light-source position P concerning the plurality of incidence regions 34A to 34I of the incidence surface 22 in the first half portion 51 and the distance from the light-source position P concerning the plurality of incidence regions 34A to 34I corresponding thereto of the incidence surface 22 in the second half portion 52 are different from each other, the light-source emission angle ranges 28A to 28I (see FIG. 5A to FIG. 5E) and the light-source emission angles corresponding thereto are equally set in both the first half portion 51 and the second half portion 52.

Additionally, although the light guiding portions 24H and 24I that are the farthest from the optical axis 21 extend in a direction perpendicular to the optical axis 21 in the preferred embodiment of FIG. 3, the light guiding portions 24H and 24I that are the farthest from the optical axis 21 extend in a direction not perpendicular to the optical axis 21, i.e., extend in a direction making an acute angle with the optical axis 21, and guide light in this direction in the two first and second half portions 51 and 52 of FIG. 16. The emission end portions 26 of the light guiding portions 24H and 24I emit light in a direction perpendicular to the optical axis 21.

The light incidence portion 23 and the light guiding portions 24A to 24I of the lens component 7 shown in FIG. 16 form the aforementioned light distribution structure. In the light guiding portions 24H and 24I making the largest angle with the optical axis 21, the aforementioned ratio relationship concerning the light distribution structure is established with respect to light in a light guiding direction making an acute angle with the optical axis 21 in addition to light in the emission direction A2 of the emission end portion 26.

Additionally, an arrangement (not shown) in which the diffusing portion of the cover 9 is abolished is conceivable, and an arrangement (not shown) in which the cover 9 itself is abolished is also conceivable. Even in these cases, the light incidence portion 23 of the lens component 7 and the plurality of light guiding portions 24A to 24I of the lens component 7 form the aforementioned light distribution structure, and it is possible to obtain high visibility over the entire circumference of the surroundings.

Figure 17:
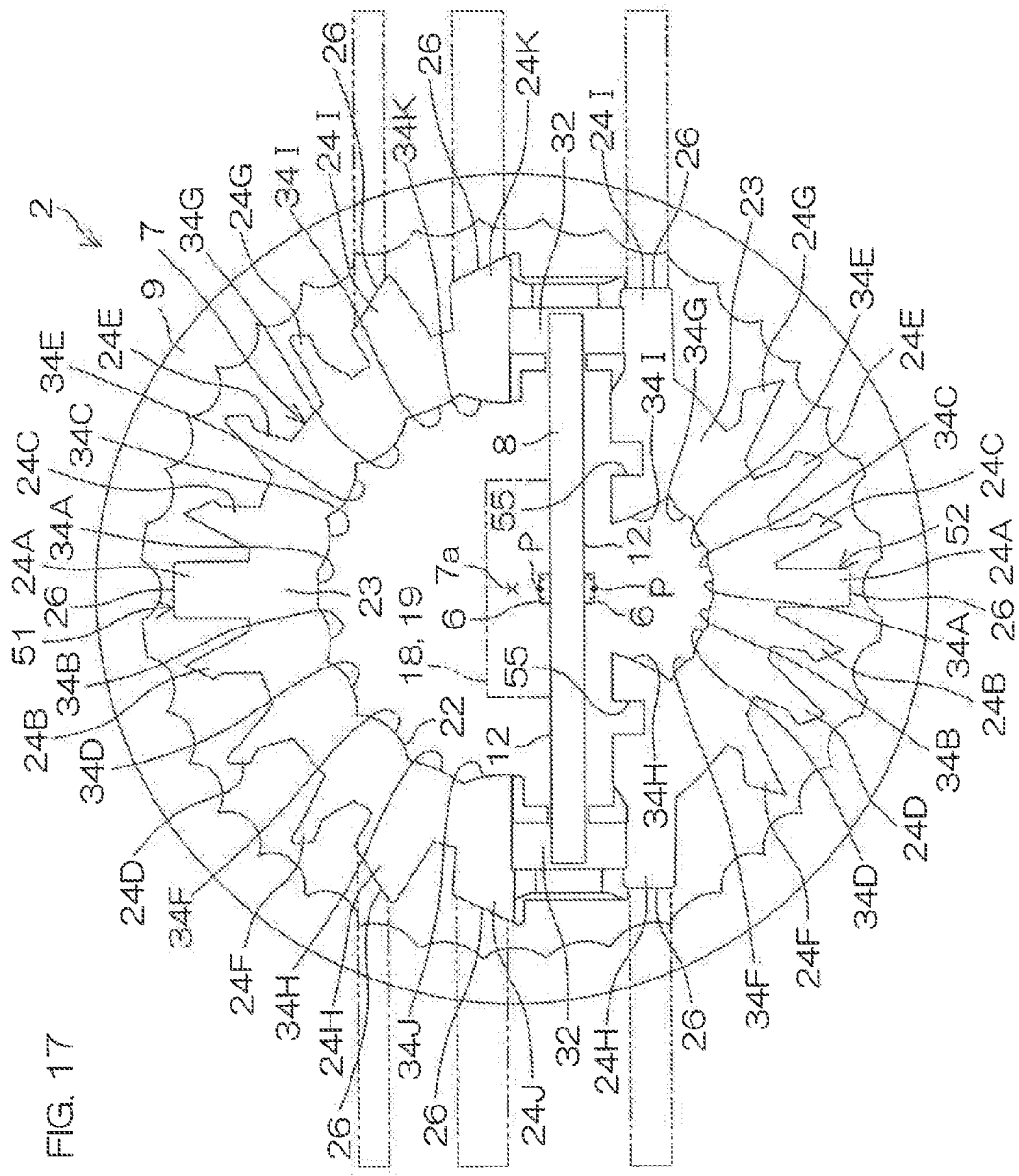
FIG. 17 is a transverse sectional view of a display unit that includes a lens component according to still another modification.

FIG. 17 is a transverse sectional view of the display unit 2 that includes a lens component according to still another modification. In FIG. 17, the same reference sign is given to an element equivalent to each element shown in FIG. 16. In the lens component according to this modification, a pair of light guiding portions 24J and 24K are added to the first half portion 51, and the protruding direction of the light guiding portions 24H and 24I included in the second half portion 52 is changed in comparison with the lens component of FIG. 16. The pair of light guiding portions 24J and 24K added to the first half portion 51 extend substantially in parallel with the principal surface of the substrate 12, and are disposed at positions, respectively, closer to the principal surface of the substrate 12 than the pair of light guiding portions 24H and 24I. Incidence regions 34J and 34K corresponding to the light guiding portions 24J and 24K added thereto are disposed on the incidence surface 22 of the light incidence portion 23. Light that has stricken the incidence regions 34J and 34K from the light source 6 is converted into parallel light by means of the incidence surface 22 in those regions, and then enters the light guiding portions 24J and 24K corresponding thereto, and is emitted from the emission end portions 26 of the light guiding portions 24J and 24K. Each emission end portion 26 of the light guiding portions 24J and 24K is designed to emit parallel light in a direction parallel to the principal surface 12 of the substrate 8, and has a flat emission end surface in the arrangement of FIG. 17.

The light guiding portions 24H and 24I of the second half portion 52 extend in a direction parallel to the principal surface 12 of the substrate 8 in the arrangement of FIG. 17. Light that has stricken the incidence regions 34H and 34I in the incidence surface 22 of the light incidence portion 23 is guided to the light guiding portions 24H and 24I. Light that has been guided through the inside of the light guiding portions 24H and 24I is emitted from the emission end portions 26 thereof. The emission end portion 26 is designed to emit light in a direction parallel to the principal surface 12 of the substrate 8, and has an emission end surface that is a flat surface in this arrangement example.

In this arrangement example, three light guiding portions 24H, 24J, 24H and three light guiding portions 24I, 24K, 24I that emit light in a direction parallel to the principal surface 12 of the substrate 8 are provided on both lateral side parts of the substrate 8, respectively. The sum total of the quantities of light that is emitted from two light sources 6 mounted at corresponding positions of both principal surfaces 12 of the substrate 8 and that enters the three light guiding portions 24H, 24J, 24H and the three light guiding portions 24I, 24K, 24I is equal to the quantity of light striking each of the light guiding portions 24A to 24G other than the light guiding portions 24H, 24J, 24H; 24I, 24K, 24I. In other words, the incidence regions 34A to 34K are designed so that this condition is satisfied with respect to the quantity of incident light.

In the arrangement example of FIG. 16, the interval between the pair of light guiding portions 24H and 24H that are disposed on the opposite sides, respectively, with respect to the substrate 8 and that emit light in a direction parallel to the principal surface 12 of the substrate 8 is comparatively wide, and therefore there is a fear that a region that is low in luminosity will be generated when viewed from the direction parallel to the principal surface 12 of the substrate 8. On the other hand, in the arrangement example of FIG. 17, in the three light guiding portions 24H, 24J, 24H; 24I, 24K, 24I that emit light in the direction parallel to the principal surface of the substrate 8, the interval between the emission end portions 26 is narrow, and therefore a dark region is not generated easily when viewed from the direction parallel to the principal surface 12 of the substrate 8, and it is possible to improve visibility from that direction.

In the arrangement example shown in FIG. 17, the light guiding portion 24A disposed on the optical axis 21 is molded in a tapered shape in which the width (thickness) becomes narrower in proportion to an approach to the emission end portion 26 from a base joined to the light incidence portion 23. As a result, it becomes easy for the lens component 7 to separate from a die when the lens component 7 is produced through a resin molding process. Additionally, in order to avoid sinking during resin molding, a recess portion 55 is formed at a position facing the principal surface 12 of the substrate 8 in the second half portion 52. The recess portion 55 is a dent (groove) that extends along the axis 7a, and is rectangular in the cross section perpendicular to the axis 7a. The recess portion 55 is positioned between the incidence region 34H of the incidence surface 22 and the light guiding portion 24H. Light that has stricken the incidence region 34H from the light source 6 passes through the recess portion 55 when it passes through the light incidence portion 23. The side surface of the recess portion 55 is set to be a flat surface perpendicular to the route of light from the incidence region 34H, and no substantial influence is exerted on that light.

Figure 18:
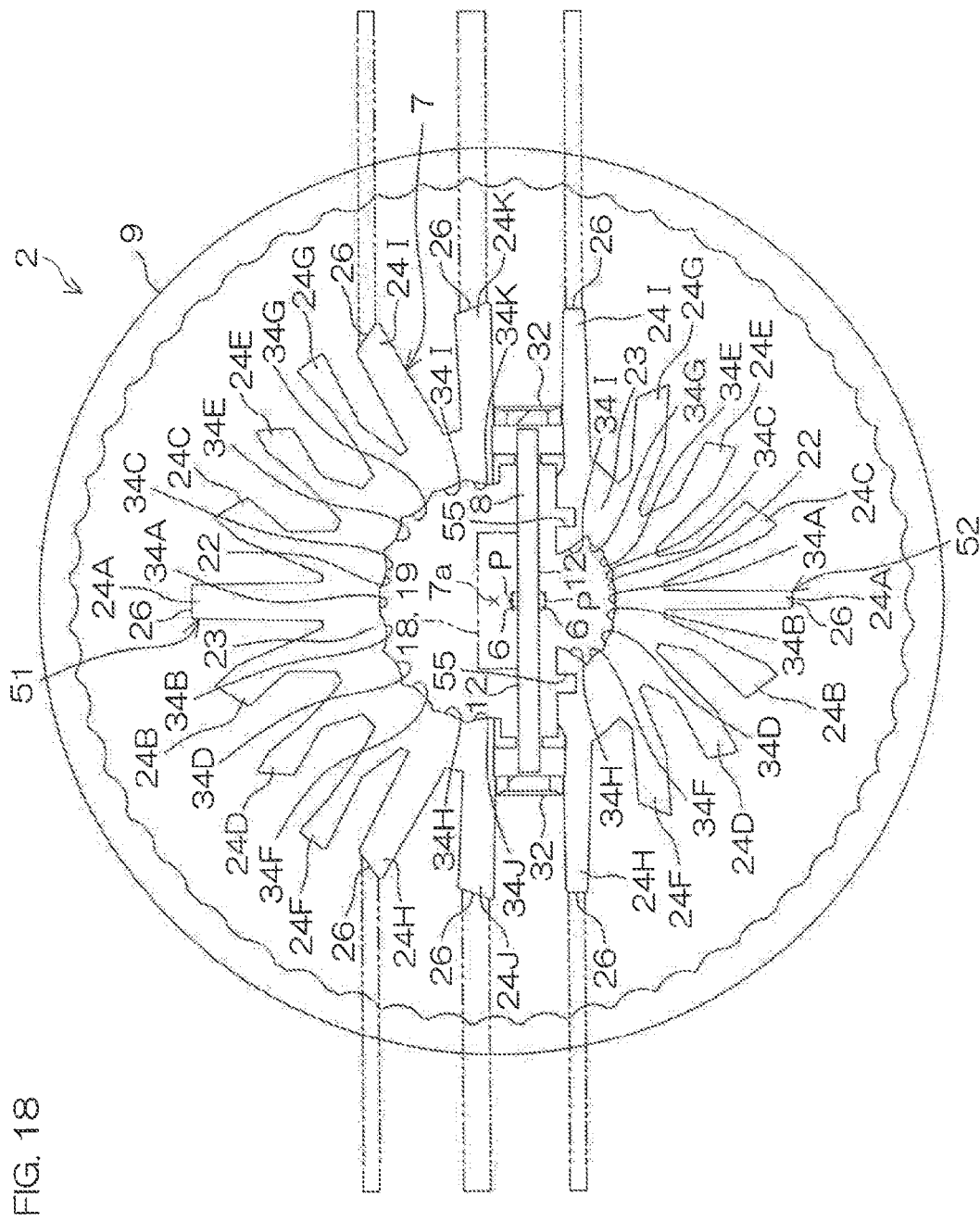
FIG. 18 is a transverse sectional view of a display unit that includes a lens component according to still another modification.

FIG. 18 is a sectional view showing still another modification. In FIG. 18, the same reference sign is given to an element equivalent to each element of FIG. 17 described above. This arrangement example is a large-diameter display unit in which the diameter of the cover 9 is larger than the arrangement example of FIG. 17. The light source 6, the substrate 8, and the connectors 18 and 19 are arranged in the same way as in the arrangement example of FIG. 17. Therefore, the light incidence portion 22 is arranged in the same way as in the arrangement example of FIG. 17. On the other hand, the light guiding portions 24A to 24K are formed longer than in the arrangement example of FIG. 17. As a result, the emission end portion 26 of the light guiding portion is brought close to the inner surface of the cover 9. This makes it possible to reduce light that leaks from both ends in the axial direction of the cover 9 and makes it possible to allow most of the light emitted from the emission end portion 26 to enter the cover 9. As a result, it is possible to reduce the quantity of light that leaks to the adjoining display unit 2, and therefore it is possible to realize clear display. On the other hand, elements, such as the light source 6 or the substrate 8 or the connectors 18 and 19, can be shared without depending on the largeness or smallness of the diameter of the display unit 2, and therefore it is possible to reduce production costs.

The aforementioned modifications may be combined with each other.

Besides, various design changes can be made within the scope of the subject matter stated in the claims.

REFERENCE SIGNS LIST

1: Stacked signal lamp (light emitting device)
2: Display unit (light emitting device)
6: Light source
7: Lens component
8: Substrate
9: Cover
11: Light-source containing portion
12: Principal surface
18, 19: Connector
22: Incidence surface
23: Light incidence portion (light distribution structure)
24A to 24K: Light guiding portion (light distribution structure)
25: Basal end portion
26: Emission end portion
27: Light-guide reflection surface
28A to 28I: Angular range
34A to 34K: Incidence region
39: Curved part
40: Diffusing lens portion (light distribution structure, diffusing portion)
41: Convex lens surface
42: Concave lens surface
51: First half portion (divided piece)
52: Second half portion (divided piece)
A1, A2: Direction
D1, D2: Angle
L1: Interval
P: Light-source position

The invention claimed is:

1. A lens component that disperses light from a light source having a light distribution characteristic in which luminosity becomes smaller according to a distance from an optical axis, the lens component comprising:
   a light incidence portion that has an incidence surface stricken by light from the light source placed at a predetermined light-source position; and
   a plurality of light guiding portions that branch from the light incidence portion and that extend radially with respect to the light-source position,
   each of the light guiding portions including:
   a basal end portion joined to the light incidence portion;
   an emission end portion that emits light outwardly away from the light source; and
   a light-guide reflection surface that guides light that has stricken the basal end portion from the light incidence portion to the emission end portion while performing internal reflection,
   the light incidence portion and the plurality of light guiding portions forming a light distribution structure,
   the light distribution structure being arranged so that a ratio of luminosity in a predetermined direction making a predetermined angle with the optical axis with respect to luminosity in a direction along the optical axis in light emitted from the light distribution structure is larger than a corresponding ratio in the light distribution characteristic of the light source,
   wherein the incidence surface includes a plurality of incidence regions that are disposed so as to face the basal end portions of the plurality of light guiding portions, respectively, and that gather light from the light source or convert light from the light source into parallel light and then let the light enter a corresponding one of the light guiding portions,
   wherein the plurality of incidence regions include a first incidence region, and a second incidence region that is disposed farther from the optical axis than the first incidence region and that is wider than the first incidence region.

2. The lens component according to claim 1, wherein the plurality of light guiding portions include:
   a first light guiding portion; and
   a second light guiding portion that is disposed farther from the optical axis than the first light guiding portion and that is stricken by light having a quantity of light equal to a quantity of incident light onto the first light guiding portion from the light source.

3. The lens component according to claim 2, wherein the first light guiding portion and the second light guiding portion each have a pair of light-guide reflection surfaces, and the second light guiding portion is larger than the first light guiding portion in an interval between the pair of light-guide reflection surfaces.

4. The lens component according to claim 1, wherein, in a plane that includes the optical axis and that traverses the plurality of light guiding portions, an angular range of the second incidence region faced from the light-source position is wider than an angular range of the first incidence region faced from the light-source position.

5. The lens component according to claim 1, wherein the plurality of light guiding portions include at least one light guiding portion in which an angle that light emitted from the emission end portion makes with the optical axis is larger than an angle that the light makes with the optical axis when the light enters the light incidence portion.

6. The lens component according to claim 1, wherein the emission end portions of the plurality of light guiding portions emit light at mutually equal quantities of light.

7. A lens component that disperses light from a light source having a light distribution characteristic in which luminosity becomes smaller according to a distance from an optical axis, the lens component comprising:
   a light incidence portion that has an incidence surface stricken by light from the light source placed at a predetermined light-source position; and
   a plurality of light guiding portions that branch from the light incidence portion and that extend radially with respect to the light-source position,
   each of the light guiding portions including:
   a basal end portion joined to the light incidence portion;
   an emission end portion that emits light outwardly away from the light source; and
   a light-guide reflection surface that guides light that has stricken the basal end portion from the light incidence portion to the emission end portion while performing internal reflection,
   the light incidence portion and the plurality of light guiding portions forming a light distribution structure,
   the light distribution structure being arranged so that a ratio of luminosity in a predetermined direction making a predetermined angle with the optical axis with respect to luminosity in a direction along the optical axis in light emitted from the light distribution structure is larger than a corresponding ratio in the light distribution characteristic of the light source,
   wherein the emission end portions of the plurality of light guiding portions are disposed in the plurality of emission regions, respectively, that are set to be away from each other so as to evenly divide a predetermined angular range with respect to a circumferential direction that centers on the light-source position and that is along a plane including the optical axis.

8. A lens component that disperses light from a light source having a light distribution characteristic in which luminosity becomes smaller according to a distance from an optical axis, the lens component comprising:
   a light incidence portion that has an incidence surface stricken by light from the light source placed at a predetermined light-source position; and
   a plurality of light guiding portions that branch from the light incidence portion and that extend radially with respect to the light-source position,
   each of the light guiding portions including:
   a basal end portion joined to the light incidence portion;
   an emission end portion that emits light outwardly away from the light source; and
   a light-guide reflection surface that guides light that has stricken the basal end portion from the light incidence portion to the emission end portion while performing internal reflection,
   the light incidence portion and the plurality of light guiding portions forming a light distribution structure,
   the light distribution structure being arranged so that a ratio of luminosity in a predetermined direction making a predetermined angle with the optical axis with respect to luminosity in a direction along the optical axis in light emitted from the light distribution structure is larger than a corresponding ratio in the light distribution characteristic of the light source,
   wherein the emission end portions of the plurality of light guiding portions emit light in a plurality of emission directions, respectively, that evenly divide a predetermined angular range with respect to a circumferential direction that centers on the light-source position and that is along a plane including the optical axis.

9. A lens component that disperses light from a light source having a light distribution characteristic in which luminosity becomes smaller according to a distance from an optical axis, the lens component comprising:
   a light incidence portion that has an incidence surface stricken by light from the light source placed at a predetermined light-source position; and
   a plurality of light guiding portions that branch from the light incidence portion and that extend radially with respect to the light-source position,
   each of the light guiding portions including:
   a basal end portion joined to the light incidence portion;
   an emission end portion that emits light outwardly away from the light source; and
   a light-guide reflection surface that guides light that has stricken the basal end portion from the light incidence portion to the emission end portion while performing internal reflection,
   the light incidence portion and the plurality of light guiding portions forming a light distribution structure,
   the light distribution structure being arranged so that a ratio of luminosity in a predetermined direction making a predetermined angle with the optical axis with respect to luminosity in a direction along the optical axis in light emitted from the light distribution structure is larger than a corresponding ratio in the light distribution characteristic of the light source,
   wherein the plurality of light guiding portions have a plate shape that extends in parallel with a straight line that is perpendicular to the optical axis and that passes through the light-source position, and the emission end portion has a convex curved part that protrudes in a direction receding from the light-source position.

10. A light emitting device comprising:
    a light source placed at a predetermined light-source position and having a light distribution characteristic in which luminosity becomes smaller according to a distance from an optical axis; and
    a lens component that disperses light from the light source, the lens component including:
    a light incidence portion that has an incidence surface stricken by light from the light source; and
    a plurality of light guiding portions that branch from the light incidence portion and that extend radially with respect to the light-source position,
    each of the light guiding portions including:
    a basal end portion joined to the light incidence portion;
    an emission end portion that emits light outwardly away from the light source; and
    a light-guide reflection surface that guides light that has stricken the basal end portion from the light incidence portion to the emission end portion while performing internal reflection, the light incidence portion and the plurality of light guiding portions forming a light distribution structure, the light distribution structure being arranged so that a ratio of luminosity in a predetermined direction making a predetermined angle with the optical axis with respect to luminosity in a direction along the optical axis in light emitted from the light distribution structure is larger than a corresponding ratio in the light distribution characteristic of the light source, wherein the light source includes a pair of light sources that share the optical axis and that emit light in mutually opposite directions.

11. The light emitting device according to claim 10, further comprising a translucent cover that is disposed outside the lens component and that has a diffusing portion that diffuses light striking from the lens component.

12. The light emitting device according to claim 11, wherein the light incidence portion, the plurality of light guiding portions, and the diffusing portion form a light distribution structure, and the light distribution structure is formed so that a ratio of luminosity in a predetermined direction making a predetermined angle with the optical axis with respect to luminosity in the direction along the optical axis in light emitted from the light distribution structure is larger than a corresponding ratio in the light distribution characteristic of the light source.

13. The light emitting device according to claim 10, wherein the plurality of light guiding portions include:
a first light guiding portion; and
a second light guiding portion that is disposed farther from the optical axis than the first light guiding portion and that is stricken by light having a quantity of light equal to a quantity of incident light onto the first light guiding portion from the light source, and
the first light guiding portion and the second light guiding portion each have a pair of light-guide reflection surfaces, and the second light guiding portion is larger than the first light guiding portion in an interval between the pair of light-guide reflection surfaces.

14. The light emitting device according to claim 10, wherein the incidence surface includes a plurality of incidence regions that are disposed so as to face the basal end portions of the plurality of light guiding portions, respectively, and that gather light from the light source or convert light from the light source into parallel light and then let the light enter a corresponding one of the light guiding portions.

15. The light emitting device according to claim 10, wherein the plurality of light guiding portions include at least one light guiding portion in which an angle that light emitted from the emission end portion makes with the optical axis is larger than an angle that the light makes with the optical axis when the light enters the light incidence portion.

16. A light emitting device comprising:
a light source placed at a predetermined light-source position and having a light distribution characteristic in which luminosity becomes smaller according to a distance from an optical axis; and
a lens component that disperses light from the light source, the lens component including:
a light incidence portion that has an incidence surface stricken by light from the light source; and
a plurality of light guiding portions that branch from the light incidence portion and that extend radially with respect to the light-source position, each of the light guiding portions including:
a basal end portion joined to the light incidence portion;
an emission end portion that emits light outwardly away from the light source; and
a light-guide reflection surface that guides light that has stricken the basal end portion from the light incidence portion to the emission end portion while performing internal reflection,
the light incidence portion and the plurality of light guiding portions forming a light distribution structure,
the light distribution structure being arranged so that a ratio of luminosity in a predetermined direction making a predetermined angle with the optical axis with respect to luminosity in a direction along the optical axis in light emitted from the light distribution structure is larger than a corresponding ratio in the light distribution characteristic of the light source, the light emitting device further comprising a substrate having a pair of principal surfaces on which the pair of light sources are mounted, respectively, wherein the lens component has:
the pair of light-source positions corresponding to the pair of light sources;
a tubular external shape extending in parallel with a straight line that is perpendicular to the optical axis and that passes through the light-source position; and
a light-source containing portion that contains the pair of light-sources so as to place the pair of light-sources at the pair of light-source positions, respectively, through the substrate, and wherein the plurality of light guiding portions are disposed such that each group consisting of ones of the plurality of light guiding portions surrounds each light source.

17. The light emitting device according to claim 16, wherein a plurality of the lens components are connectable together along an axis of the tubular shape, and the plurality of substrates are disposed at the light-source containing portions of the plurality of lens components, respectively,
the light emitting device further comprising a connector by which the substrates disposed at the light-source containing portions, respectively, of the lens components contiguous to each other are electrically connected to each other.

18. The light emitting device according to claim 17, wherein the substrate is disposed such that the pair of principal surfaces follow a direction in which the axis of the tubular shape of the lens component extends while being offset from the axis, and the connector is mounted on a first principal surface that is one of the pair of principal surfaces and that is on a side closer to the axis.

19. The light emitting device according to claim 18, wherein a distance to the incidence surface from the light source mounted on the first principal surface is longer than a distance to the incidence surface from the light source mounted on a second principal surface that is one of the pair of principal surfaces and that is on a side farther from the axis.

20. The light emitting device according to claim 16, wherein the lens component includes divided pieces obtained by dividing the tubular external shape into a plurality of pieces in a circumferential direction, and forms a tubular external shape by joining the divided pieces together in the circumferential direction.

21. The light emitting device according to claim 16, wherein
the plurality of light guiding portions include:

a first light guiding portion; and a second light guiding portion that is disposed farther from the optical axis than the first light guiding portion and that is stricken by light having a quantity of light equal to a quantity of incident light onto the first light guiding portion from the light source, and the first light guiding portion and the second light guiding portion each have a pair of light-guide reflection surfaces, and the second light guiding portion is larger than the first light guiding portion in an interval between the pair of light-guide reflection surfaces.

22. The light emitting device according to claim 16, wherein the incidence surface includes a plurality of incidence regions that are disposed so as to face the basal end portions of the plurality of light guiding portions, respectively, and that gather light from the light source or convert light from the light source into parallel light and then let the light enter a corresponding one of the light guiding portions.

23. The light emitting device according to claim 16, wherein the plurality of light guiding portions include at least one light guiding portion in which an angle that light emitted from the emission end portion makes with the optical axis is larger than an angle that the light makes with the optical axis when the light enters the light incidence portion.

* * * * *